(12) United States Patent
Nakao et al.

(10) Patent No.: US 12,174,500 B2
(45) Date of Patent: Dec. 24, 2024

(54) DISPLAY DEVICE

(71) Applicant: Japan Display Inc., Tokyo (JP)

(72) Inventors: Takayuki Nakao, Tokyo (JP); Takehiro Shima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/071,852

(22) Filed: Nov. 30, 2022

(65) Prior Publication Data

US 2023/0176431 A1 Jun. 8, 2023

(30) Foreign Application Priority Data

Dec. 6, 2021 (JP) .................................. 2021-198143

(51) Int. Cl.
*G02F 1/1362* (2006.01)

(52) U.S. Cl.
CPC .. *G02F 1/136222* (2021.01); *G02F 1/136286* (2013.01)

(58) Field of Classification Search
CPC .................................................... G02F 1/1362
See application file for complete search history.

(56) References Cited

U.S. PATENT DOCUMENTS

| | | | |
|---|---|---|---|
| 5,945,972 A | 8/1999 | Okumura et al. | |
| 6,184,960 B1 * | 2/2001 | Sawayama | G02F 1/1345 |
| | | | 257/E21.414 |
| 2007/0177080 A1 * | 8/2007 | Higa | G02F 1/133555 |
| | | | 349/114 |
| 2012/0228603 A1 * | 9/2012 | Nakamura | H10K 59/38 |
| | | | 257/40 |
| 2014/0022499 A1 * | 1/2014 | Tamaki | G02F 1/133555 |
| | | | 349/112 |
| 2017/0351153 A1 * | 12/2017 | Mochizuki | H01L 27/124 |
| 2021/0063798 A1 * | 3/2021 | Jiang | G02F 1/136227 |
| 2022/0317494 A1 * | 10/2022 | Liu | G02F 1/136295 |
| 2022/0384488 A1 * | 12/2022 | Miao | G02F 1/136254 |

FOREIGN PATENT DOCUMENTS

| | | | | |
|---|---|---|---|---|
| CN | 113437129 | * | 9/2021 | ............. H01L 27/32 |
| CN | 113437129 A | * | 9/2021 | ............. H10K 50/85 |
| JP | H09-212140 A | | 8/1997 | |
| WO | WO 2007135000 | * | 11/2007 | ........... G02F 1/1339 |
| WO | WO-2007135000 A1 | * | 11/2017 | ........... G02F 1/1362 |

* cited by examiner

*Primary Examiner* — Sang V Nguyen
(74) *Attorney, Agent, or Firm* — K&L Gates LLP

(57) ABSTRACT

According to an aspect, a display device includes: an array substrate comprising reflective electrodes arrayed in a matrix having a row-column configuration in a first direction and a second direction and a light-transmitting conductive layer at least partially overlapping any one of the reflective electrodes when viewed in a third direction orthogonal to the first direction and the second direction; a counter substrate comprising a common electrode overlapping the reflective electrodes when viewed in the third direction and a color filter including a plurality of colors; and a backlight. The array substrate is disposed between the counter substrate and the backlight. Part of the light-transmitting conductive layer protrudes between two reflective electrodes adjacently disposed in the first direction among the reflective electrodes.

5 Claims, 18 Drawing Sheets

DISPLAY DEVICE

CROSS-REFERENCE TO RELATED APPLICATION

This application claims the benefit of priority from Japanese Patent Application No. 2021-198143 filed on Dec. 6, 2021, the entire contents of which are incorporated herein by reference.

BACKGROUND

1. Technical Field

What is disclosed herein relates to a display device.

2. Description of the Related Art

Japanese Patent Application Laid-open Publication No. H9-212140 (JP-A-H9-212140) describes a display device the screen of which is easy to view and that consumes less power in both a bright external environment and an external environment where sufficient brightness is not secured.

There is a growing demand for the display device described in JP-A-H9-212140 to improve the characteristics in transmissive display besides the characteristics in reflective display.

For the foregoing reasons, there is a need for a display device that consumes less power in a bright external environment and can improve the display quality in an external environment where sufficient brightness is not secured.

SUMMARY

According to an aspect, a display device includes: an array substrate comprising reflective electrodes arrayed in a matrix having a row-column configuration in a first direction and a second direction and a light-transmitting conductive layer at least partially overlapping any one of the reflective electrodes when viewed in a third direction orthogonal to the first direction and the second direction; a counter substrate comprising a common electrode overlapping the reflective electrodes when viewed in the third direction and a color filter including a plurality of colors; and a backlight. The array substrate is disposed between the counter substrate and the backlight. Part of the light-transmitting conductive layer protrudes between two reflective electrodes adjacently disposed in the first direction among the reflective electrodes.

DETAILED DESCRIPTION

Figure 1:
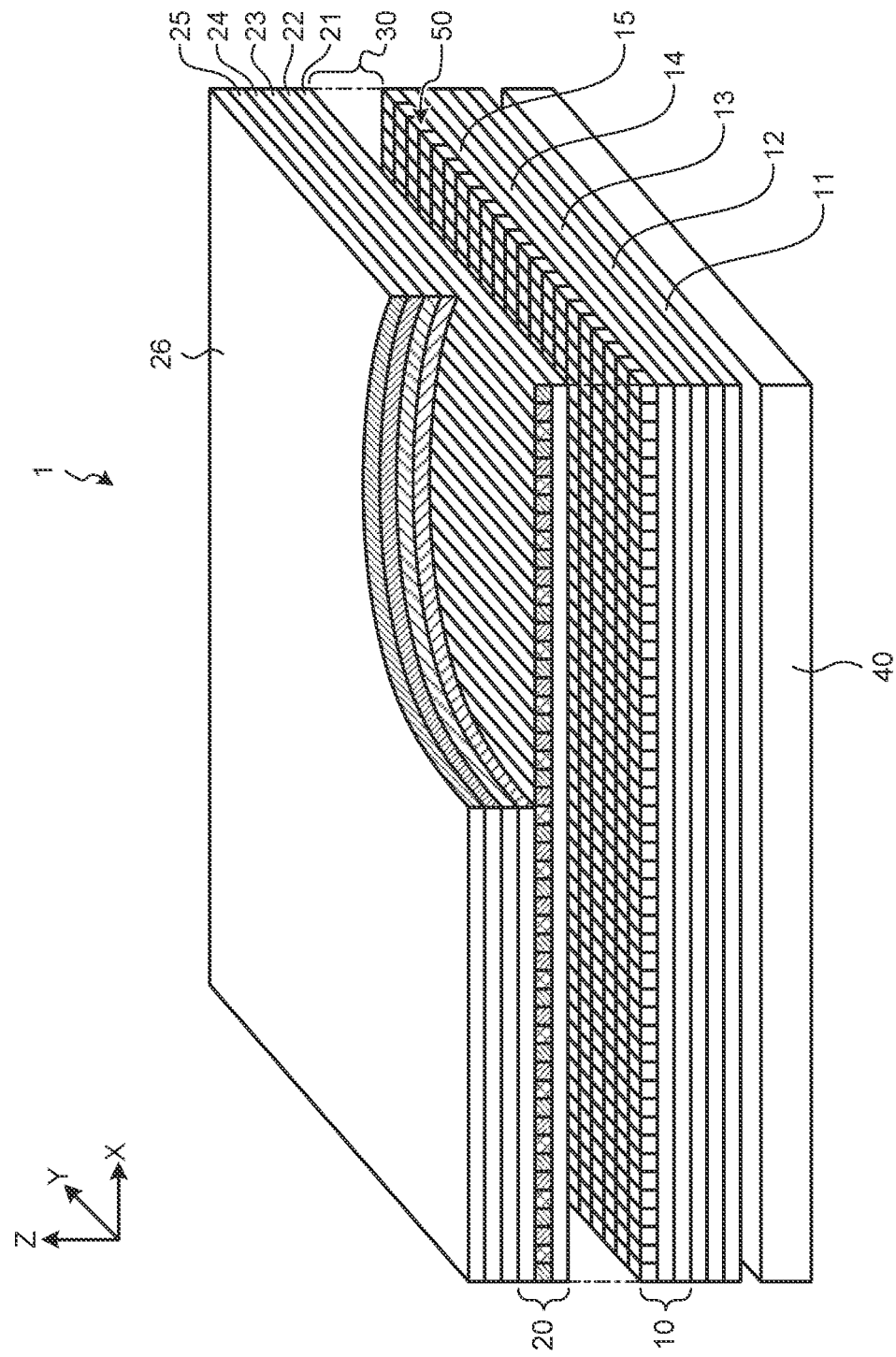
FIG. 1 is an oblique view of a configuration example of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the invention and easily conceivable by those skilled in the art naturally fall within the scope of the present disclosure. To simplify the explanation, the drawings may possibly illustrate the width, the thickness, the shape, and other elements of each component more schematically than those in the actual aspect. These elements, however, are given by way of example only and are not intended to limit interpretation of the present disclosure. In the present specification and the drawings, components similar to those previously described with reference to the previous drawings are denoted by the same reference numerals, and detailed explanation thereof may be appropriately omitted.

In this disclosure, when an element is described as being "on" another element, the element can be directly on the other element, or there can be one or more elements between the element and the other element.

Display Device

The following describes an example of the configuration of a display device according to a first embodiment with reference to FIG. 1. FIG. 1 is an oblique view of a configuration example of the display device according to the first embodiment.

As illustrated in FIG. 1, a display device 1 according to the first embodiment includes an array substrate 10, a counter substrate 20, a liquid crystal layer 30, and a backlight 40. The array substrate 10 and the counter substrate 20 are disposed facing each other with a predetermined gap interposed therebetween. The liquid crystal layer 30 is disposed in the gap between the array substrate 10 and the counter substrate 20. The backlight 40 is configured to output light to the array substrate 10.

The array substrate 10 includes a first substrate 14, a multilayered structure 15, and pixels 50 divided by pixel electrodes. The array substrate 10 is stacked on a polarizing plate 11, a half-wave plate 12, and a quarter-wave plate 13.

One or all of the polarizing plate 11, the half-wave plate 12, and the quarter-wave plate 13 may be omitted.

The display device 1 includes a plurality of signal lines and a plurality of scanning lines, which are not illustrated, on the first substrate 14. The signal lines and the scanning lines are formed to intersect each other. The pixels (hereinafter, which may be simply referred to as "pixels") 50 are two-dimensionally arrayed in a matrix (row-column configuration) at the intersections of the signal lines and the scanning lines. Circuit elements, such as switching elements (e.g., thin-film transistors (TFTs)) and capacitance elements, which are not illustrated, are formed for the respective pixels 50 on the first substrate 14. The array substrate 10 may be called a TFT substrate because the circuit elements including TFTs are formed thereon.

The signal lines formed on the first substrate 14 are wiring that transmits signals (e.g., display signals and video signals) for driving the pixels 50. The signal lines have a wiring structure extending along the pixel array direction, that is, the column direction (Y-direction in FIG. 1) for the respective pixel columns in the matrix arrangement of the pixels 50.

The scanning lines formed on the first substrate 14 are wiring that transmits signals (e.g., scanning signals) for selecting the pixels 50 row by row. The scanning lines have a wiring structure extending along the pixel array direction, that is, the row direction (X-direction in FIG. 1) for the respective pixel rows in the matrix arrangement of the pixels 50. The X-direction and the Y-direction are orthogonal to each other.

The multilayered structure 15 includes the circuit elements, the signal lines, the scanning lines, and insulating layers formed on the first substrate 14.

The counter substrate 20 includes a common electrode 21, a color filter 22, and a second substrate 23. The counter substrate 20 is stacked on a quarter-wave plate 24, a half-wave plate 25, and a polarizing plate 26.

The common electrode 21 is a light-transmitting electrode made of indium tin oxide (ITO) or the like.

In the color filter 22, for example, stripe-shaped filters in R (red), G (green), and B (blue) extending in the column direction (Y-direction) are repeatedly arrayed at the same pitch as that of the pixels 50 in the row direction (X-direction).

The array substrate 10, the counter substrate 20, and the liquid crystal layer 30 constitute a liquid crystal display panel (display device 1). In the display device 1, the upper surface (front surface) of the counter substrate 20 serves as a display surface.

The backlight 40 is an illuminator that outputs light to the back surface of the liquid crystal display panel (display device 1), that is, to the surface of the array substrate 10 opposite to the surface thereof facing the liquid crystal layer 30. While the backlight 40 can be composed of known members, such as a light source (e.g., a light-emitting diode (LED)), a light guide plate, a prism sheet, and a diffusion sheet, it is not limited thereto.

Figure 2:
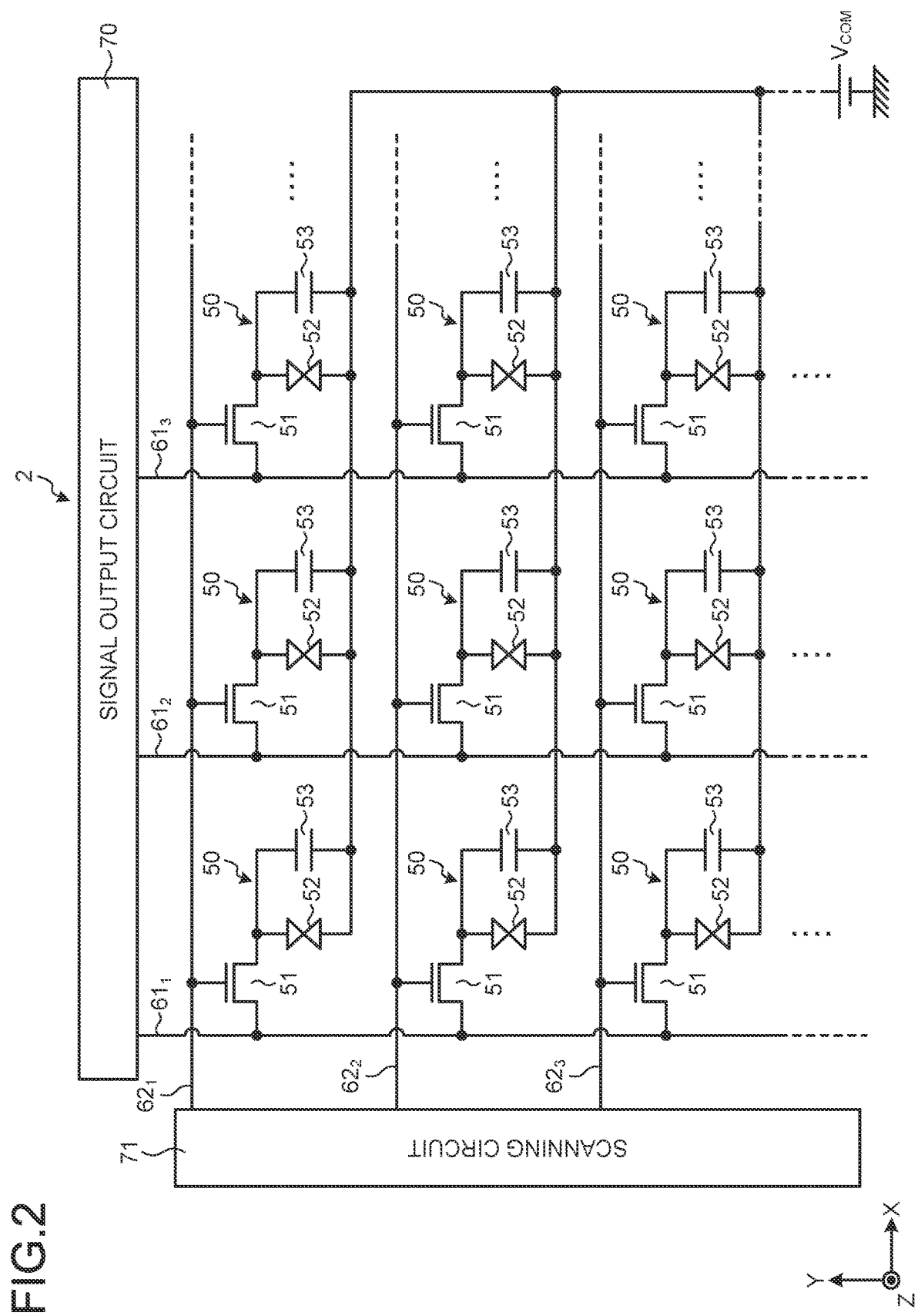
FIG. 2 is a diagram of a configuration example of a pixel circuit according to the first embodiment.

The following describes a configuration example of a pixel circuit according to the embodiment with reference to FIG. 2. FIG. 2 is a diagram of a configuration example of the pixel circuit according to the first embodiment. The X-direction and the Y-direction illustrated in FIG. 2 indicate the row direction and the column direction, respectively, of the display device 1 illustrated in FIG. 1.

As illustrated in FIG. 2, a pixel circuit 2 includes the pixels 50, a plurality of signal lines 61 ($61_1$, $61_2$, $61_3$, ... ), a plurality of scanning lines 62 ($62_1$, $62_2$, $62_3$, ... ), a signal output circuit 70, and a scanning circuit 71.

The signal lines 61 are arrayed in the X-direction. The scanning lines 62 are arrayed in the Y-direction. The signal lines 61 and the scanning lines 62 are disposed to intersect each other. The pixels 50 are disposed at the intersections of the signal lines 61 and the scanning lines 62. The pixels 50, the signal lines 61, and the scanning lines 62 are formed on the surface of the first substrate 14 of the array substrate 10 illustrated in FIG. 1.

First ends of the signal lines 61 are electrically coupled to the signal output circuit 70. Specifically, the signal lines 61 are electrically coupled to the respective output terminals of the signal output circuit 70.

First ends of the scanning lines 62 are electrically coupled to the scanning circuit 71. Specifically, the scanning lines 62 are electrically coupled to the respective output terminals of the scanning circuit 71.

Each pixel 50 includes a pixel transistor 51, a liquid crystal capacitor 52, and a holding capacitor 53, for example. In the following description, the pixel refers to a sub-pixel included in a unit pixel displaying what is called RGB colors and to any one of an R sub-pixel that displays red, a G sub-pixel that displays green, and a B sub-pixel that displays blue. The unit pixel does not necessarily include the RGB sub-pixels as the sub-pixels. The unit pixel may have a configuration including sub-pixels in other colors, such as W (white) and Y (yellow), besides RGB or may have a configuration not including any one of the RGB sub-pixels.

The pixel transistor 51 is a thin-film transistor, such as a TFT. The gate electrode of the pixel transistor 51 is electrically coupled to the scanning line 62. The source electrode of the pixel transistor 51 is electrically coupled to the signal line 61. The drain electrode of the pixel transistor 51 is electrically coupled to a first end of the liquid crystal capacitor 52.

The liquid crystal capacitor 52 is a capacitive component of the liquid crystal material generated between the pixel electrode and the common electrode 21. A first end of the liquid crystal capacitor 52 is electrically coupled to the pixel transistor 51. A second end of the liquid crystal capacitor 52 is supplied with a common potential VCOM.

A first electrode of the holding capacitor 53 is electrically coupled to the first end of the liquid crystal capacitor 52. A second electrode of the holding capacitor 53 is electrically coupled to the second end of the liquid crystal capacitor 52.

The signal output circuit 70 outputs video signals for driving the pixels 50 to each of the signal lines 61. The signal lines 61 are wiring for transmitting the video signals to the pixels 50 in each pixel column.

The scanning circuit 71 outputs scanning signals for selecting the pixels 50 row by row to the scanning lines 62. The scanning lines 62 are wiring for transmitting operating signals to the pixels 50 in each pixel row.

Figure 3:
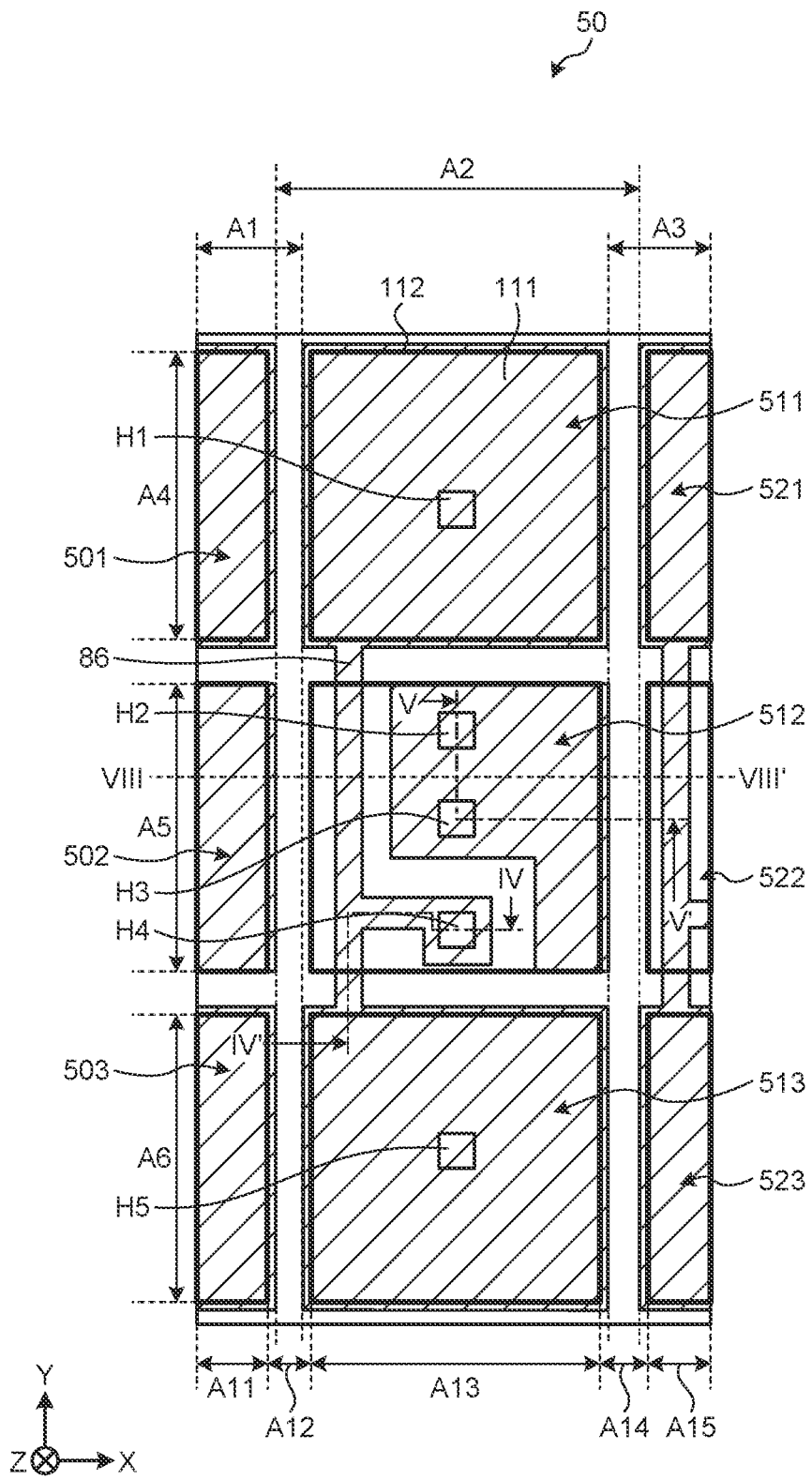
FIG. 3 is a plan view of a pixel according to the first embodiment.

The following describes the pixel according to the first embodiment with reference to FIG. 3. FIG. 3 is a plan view of the pixel according to the first embodiment. A reflective display region A11 is provided with reflective electrodes 501, 502, and 503 serving as pixel electrodes for the respective pixels 50. A reflective display region A13 is provided with reflective electrodes 511, 512, and 513 serving as pixel electrodes for the respective pixels 50. A reflective display region A15 is provided with reflective electrodes 521, 522, and 523 serving as pixel electrodes for the respective pixels 50. The reflective electrodes 501, 502, 503, 511, 512, 513, 521, 522, and 523 reflect external light incident through the counter substrate 20 to the counter substrate 20 as reflected light. In the reflective display regions, an image is displayed by the reflected light reflected by the reflective electrodes 501, 502, 503, 511, 512, 513, 521, 522, and 523. The reflective display regions A11 and A15 are sub-pixel regions adjacent to the reflective display region serving as one sub-pixel region and have the same width as that of the reflective display region A13. FIG. 3 illustrates part of the reflective display regions A11 and A15 close to the reflective display region and does not illustrate the other part.

Light output from the backlight 40 to the array substrate 10 passes through a transmissive display region A12 and a transmissive display region A14. In an external environment where sufficient brightness is not secured, the light output from the backlight 40 and passing through the transmissive display regions A12 and A14 is effectively used.

As illustrated in FIG. 3, the reflective electrodes 501, 502, 503, 511, 512, 513, 521, 522, and 523 each include a light-transmitting conductive layer 111 and a reflective electrode layer 112. To simplify the explanation, the example illustrated in FIG. 3 does not illustrate the components other than the light-transmitting conductive layer 111 and the reflective electrode layer 112.

The light-transmitting conductive layer 111 is a light-transmitting electrode made of ITO or the like. The reflective electrode layer 112 is an electrode made of a metal film, such as Ag (silver), to reflect incident light from the outside.

In FIG. 3, a region A1, a region A2, and a region A3 are regions covered with respective color filters in different colors extending in the Y-direction. The region A1 is a region covered with the red color filter, for example. The region A2 is a region covered with the green color filter, for example. The region A3 is a region covered with the blue color filter, for example.

In FIG. 3, a region A4, a region A5, and a region A6 are arrangement regions of the reflective electrode layers 112 arrayed in the Y-direction. In other words, the pixel according to the present embodiment includes three pixel electrodes arrayed in the Y-direction. By changing the number of reflective electrode layers 112 simultaneously driven out of the three reflective electrode layers 112 arrayed in the Y-direction, the display area contributing to display is changed, thereby expressing the gradation. The method of changing the gradation by changing the display area is called "area coverage modulation". The regions A4 and A6 according to the present embodiment are simultaneously turned on and off because they are electrically coupled by relay wiring 86. The reflective electrode layers 112 positioned in the regions A4 and A6 constitute a most significant bit (MSB) region because they contribute to high-gradation display in the pixel. The region A5 positioned between the regions A4 and A6 is independently turned on and off. The reflective electrode layer 112 positioned in the region A5 is a least significant bit (LSB) region because it contributes to low-gradation display in the pixel. The maximum gradation of the sub-pixel is achieved when the MSB region and the LSB region are simultaneously turned on. The gradation sequentially decreases when the MSB region alone is turned on and when the LSB region alone is turned on. The gradation of the sub-pixel is 0 when both the MSB region and the LSB region are turned off. While the relay wiring 86 and the reflective electrode layer 112 seem to overlap, the relay wiring 86 does not interfere with the reflective electrode layer 112 because an insulating layer is interposed therebetween.

In FIG. 3, the reflective display regions A11, A13, and A15 are regions for displaying an image by light incident from the observer's side and reflected by the reflective electrode layers 112 in a bright external environment. The reflective display regions provide sufficient luminance when they are used outdoors in the daytime because they use ambient light. The reflective display regions, however, provide slightly lower luminance in a slightly dark external environment or the like. In this case, the backlight is turned on to cause the light output from the backlight 40 to pass through the transmissive display regions A12 and A14. As a result, the transmissive display regions A12 and A14 can also contribute to display, thereby hampering reduction in luminance as the display region. Thus, the transmissive display regions A12 and A14 assist display in the reflective display regions using transmitted light from the backlight.

In the example illustrated in FIG. 3, a contact hole H1, a contact hole H3, and a contact hole H5 each electrically couple the reflective electrode layer 112 and the light-transmitting conductive layer 111 that overlap each other in a Z-direction.

Figure 4:
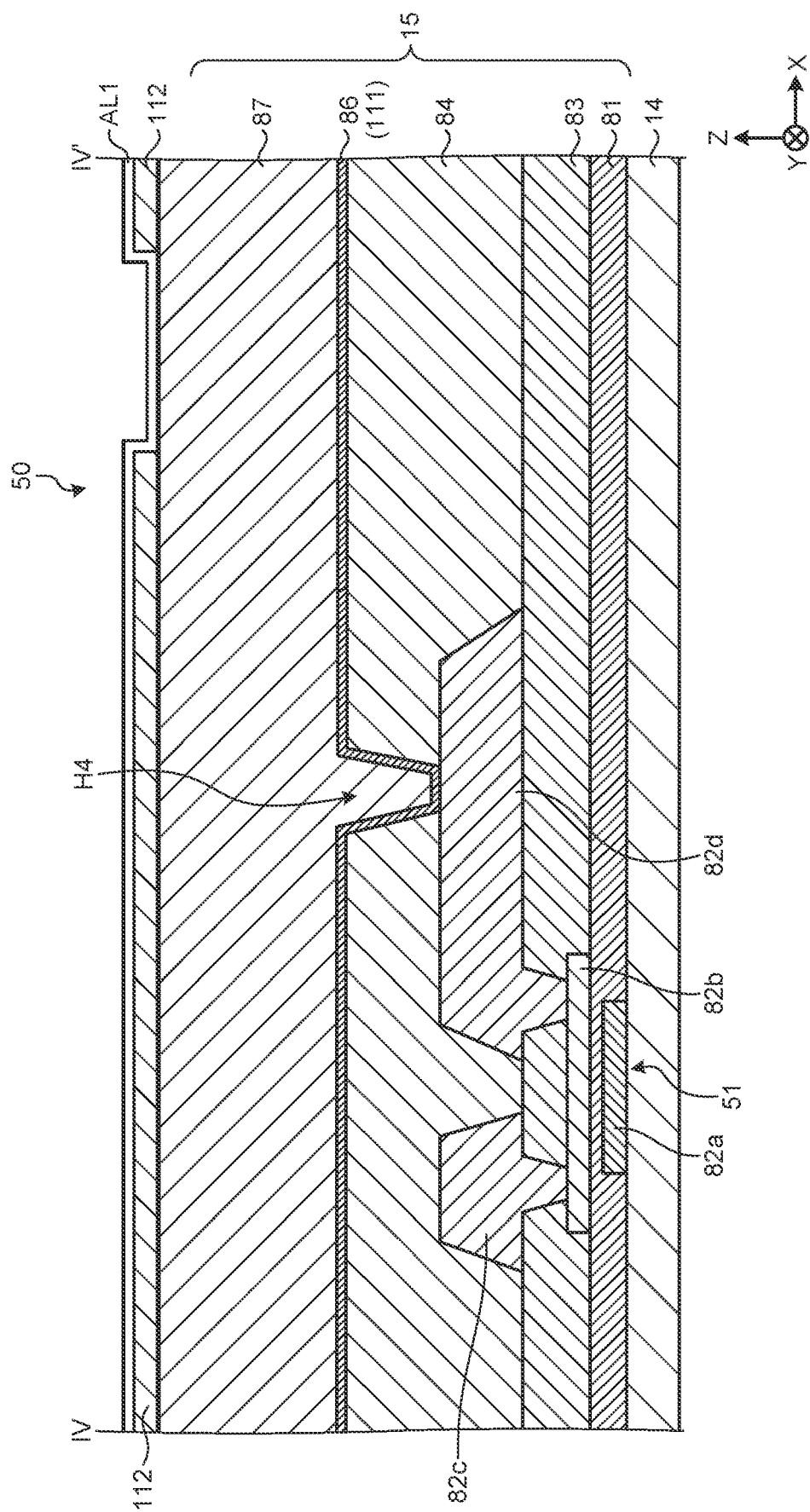
FIG. 4 is a sectional view along line IV-IV' of FIG. 3.

FIG. 4 is a sectional view along line IV-IV' of FIG. 3. A contact hole H4 electrically couples the relay wiring 86 and a drain electrode 82d of the pixel transistor 51 illustrated in FIG. 4.

Figure 5:
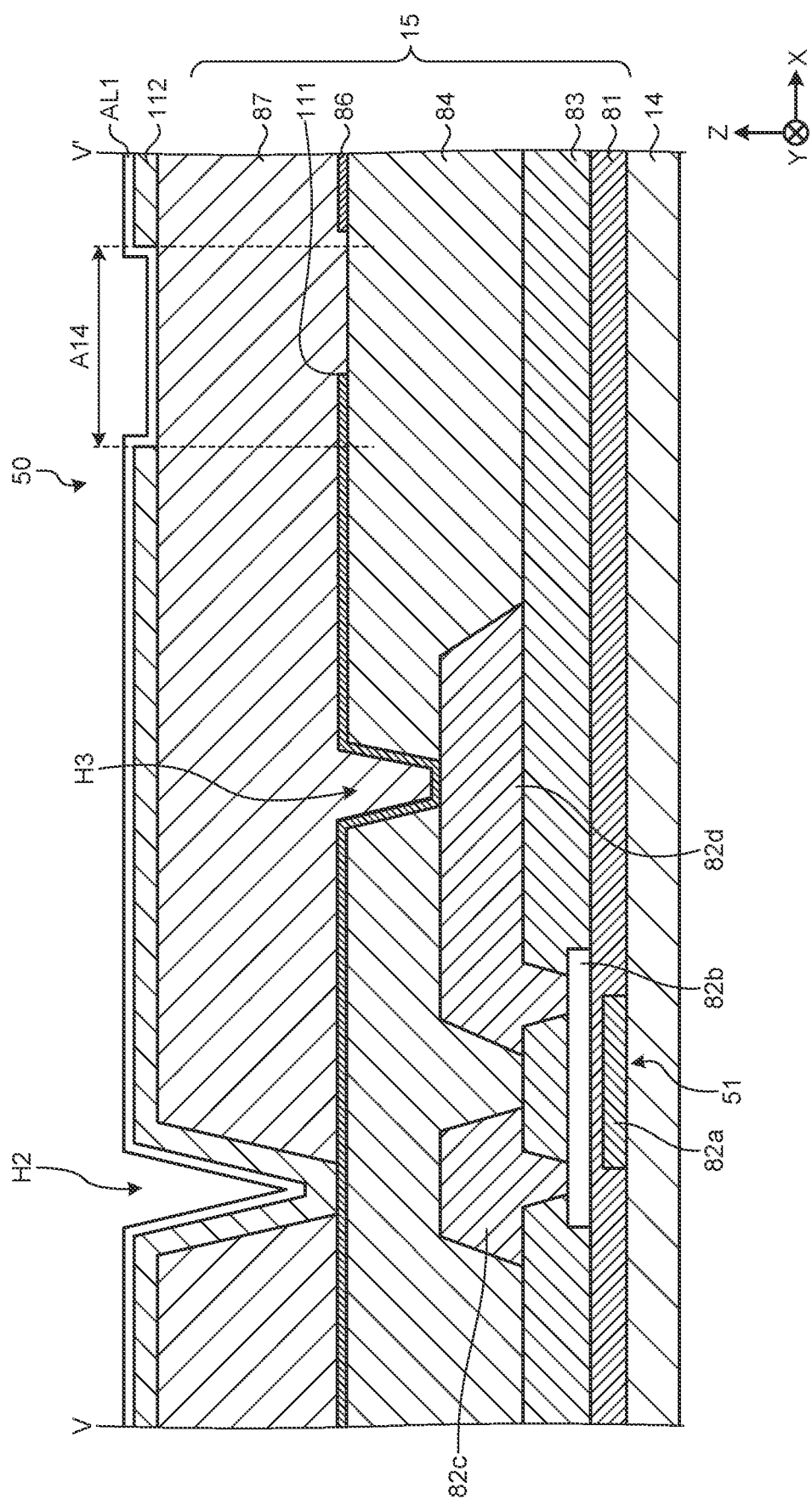
FIG. 5 is a sectional view along line V-V' of FIG. 3.

FIG. 5 is a sectional view along line V-V' of FIG. 3. A contact hole H3 electrically couples the light-transmitting conductive layer 111 and the drain electrode 82d of the pixel transistor 51 illustrated in FIG. 5.

As illustrated in FIGS. 4 and 5, the multilayered structure 15 includes the pixel transistor 51, a first insulating layer 81, a second insulating layer 83, a third insulating layer 84, the relay wiring 86, a fourth insulating layer 87, and the light-transmitting conductive layer 111. The reflective electrode layer 112 and an orientation film AL1 are stacked on the multilayered structure 15. The orientation film AL1 is subjected to rubbing to obtain liquid crystal orientation. The orientation film AL1 may be subjected to photo-orientation treatment or may not be subjected to rubbing or photo-orientation treatment.

The first substrate 14 is a glass substrate, for example. The first substrate 14 is not limited to a glass substrate, for example, and simply needs to be made of light-transmitting material.

As illustrated in FIGS. 4 and 5, the pixel transistor 51 is formed on the first substrate 14. The pixel transistor 51 illustrated in FIG. 4 drives the reflective electrode layer 112 and the light-transmitting conductive layer 111 in the MSB region. The pixel transistor 51 illustrated in FIG. 5 drives the reflective electrode layer 112 and the light-transmitting conductive layer 111 in the LSB region.

The pixel transistor 51 illustrated in FIGS. 4 and 5 is a switching element that switches between on and off of the supply of electric power (supply of the pixel signals) to the pixel electrode. The pixel transistor 51 includes a gate electrode 82a and a semiconductor layer 82b. The gate electrode 82a is formed on the upper side of the first substrate 14. The semiconductor layer 82b is formed to cover the gate electrode 82a. The semiconductor layer 82b has a channel region at the center. While the pixel transistor 51 illustrated in FIGS. 4 and 5 has what is called a bottom-gate structure in which the gate electrode 82a is provided on the lower side of the semiconductor layer 82b, it may have a top-gate structure in which the gate electrode 82a is provided on the upper side of the semiconductor layer 82b.

The second insulating layer 83 illustrated in FIGS. 4 and 5 is formed to cover the first substrate 14 and the pixel transistor 51. A source electrode 82c is formed on the second insulating layer 83. The drain electrode 82d is formed on the second insulating layer 83. The source electrode 82c is electrically coupled to the left end of the semiconductor layer 82b. The drain electrode 82d is electrically coupled to the right end of the semiconductor layer 82b.

The third insulating layer 84 illustrated in FIGS. 4 and 5 is formed on the second insulating layer 83 to cover the source electrode 82c and the drain electrode 82d. The third insulating layer 84 is a flattening layer that flattens unevenness due to the pixel transistor 51, the source electrode 82c, the drain electrode 82d, and other components and is an organic film made of acrylic resin, for example.

The contact hole H4 illustrated in FIG. 4 is formed in the third insulating layer 84. The contact hole H4 is formed above the drain electrode 82d, for example.

The contact hole H3 illustrated in FIG. 5 is formed in the third insulating layer 84. The contact hole H3 is formed above the drain electrode 82d, for example.

The relay wiring 86 illustrated in FIGS. 4 and 5 is formed on the third insulating layer 84. The relay wiring 86 is formed by: depositing a conductive thin film, such as ITO, on the surface of the third insulating layer 84 and forming a desired circuit pattern therein by photolithography, for example. The relay wiring 86 illustrated in FIGS. 4 and 5 is provided in the same layer as that of the light-transmitting conductive layer 111 illustrated in FIG. 5. The light-transmitting conductive layer 111 is made of the same material as that of the relay wiring 86, and the light-transmitting conductive layer 111 and the relay wiring 86 can be simultaneously formed. Therefore, the process of forming them can be shortened.

The fourth insulating layer 87 illustrated in FIGS. 4 and 5 is formed on the third insulating layer 84 to cover the relay wiring 86 and the light-transmitting conductive layer 111. The fourth insulating layer 87 is a flattening layer that flattens unevenness on the surface due to the contact holes H3, H4, the relay wiring 86, and other components and is an organic film made of acrylic resin, for example.

The reflective electrode layer 112 is formed on the fourth insulating layer 87. The reflective electrode layer 112 is formed by: depositing a conductive thin film with high reflectance, such as Ag (silver) or Al (aluminum), on the surface of the fourth insulating layer 87 and forming a desired circuit pattern therein by photolithography, for example. The reflective electrode layers 112 serve as the reflective electrodes 501, 502, 503, 511, 512, 513, 521, 522, and 523 (refer to FIG. 3).

As illustrated in FIGS. 1, 3 and 4, the pixel transistor 51, the relay wiring 86, the light-transmitting conductive layer 111, and the reflective electrode layer 112 are electrically coupled through the contact holes H4 and H1 or the contact holes H4 and H5.

As illustrated in FIGS. 3 and 5, the pixel transistor 51, the relay wiring 86, the light-transmitting conductive layer 111, and the reflective electrode layer 112 are electrically coupled through the contact holes H2 and H3.

As illustrated in FIG. 3, the light-transmitting conductive layer 111 and the reflective electrode layer 112 according to the first embodiment are formed in each of the reflective display regions A11, A13, and A15. The light-transmitting conductive layer 111 in the region A1 is formed such that at least part of the light-transmitting conductive layer 111 extends from the region A1 to an overlapping region where the region A1 and the region A2 overlap, for example. The light-transmitting conductive layer 111 in the region A2 is formed such that at least part of the light-transmitting conductive layer 111 extends from the region A2 to the overlapping region where the region A1 and the region A2 overlap and an overlapping region where the region A2 and the region A3 overlap. The light-transmitting conductive layer 111 in the region A3 is formed such that at least part of the light-transmitting conductive layer 111 extends from the region A3 to the overlapping region where the region A2 and the region A3 overlap. Part of the light-transmitting conductive layers 111 of the reflective electrodes 511 and 513 out of the reflective electrodes 511, 512, and 513 protrude to the reflective electrode 512 adjacent thereto in the Y-direction more than the reflective electrode layer 112 in plan view. The light-transmitting conductive layer 111 of the reflective electrode 512 does not protrude to a transmissive display region more than the reflective electrode layer 112 in the Y-direction.

Figure 6:
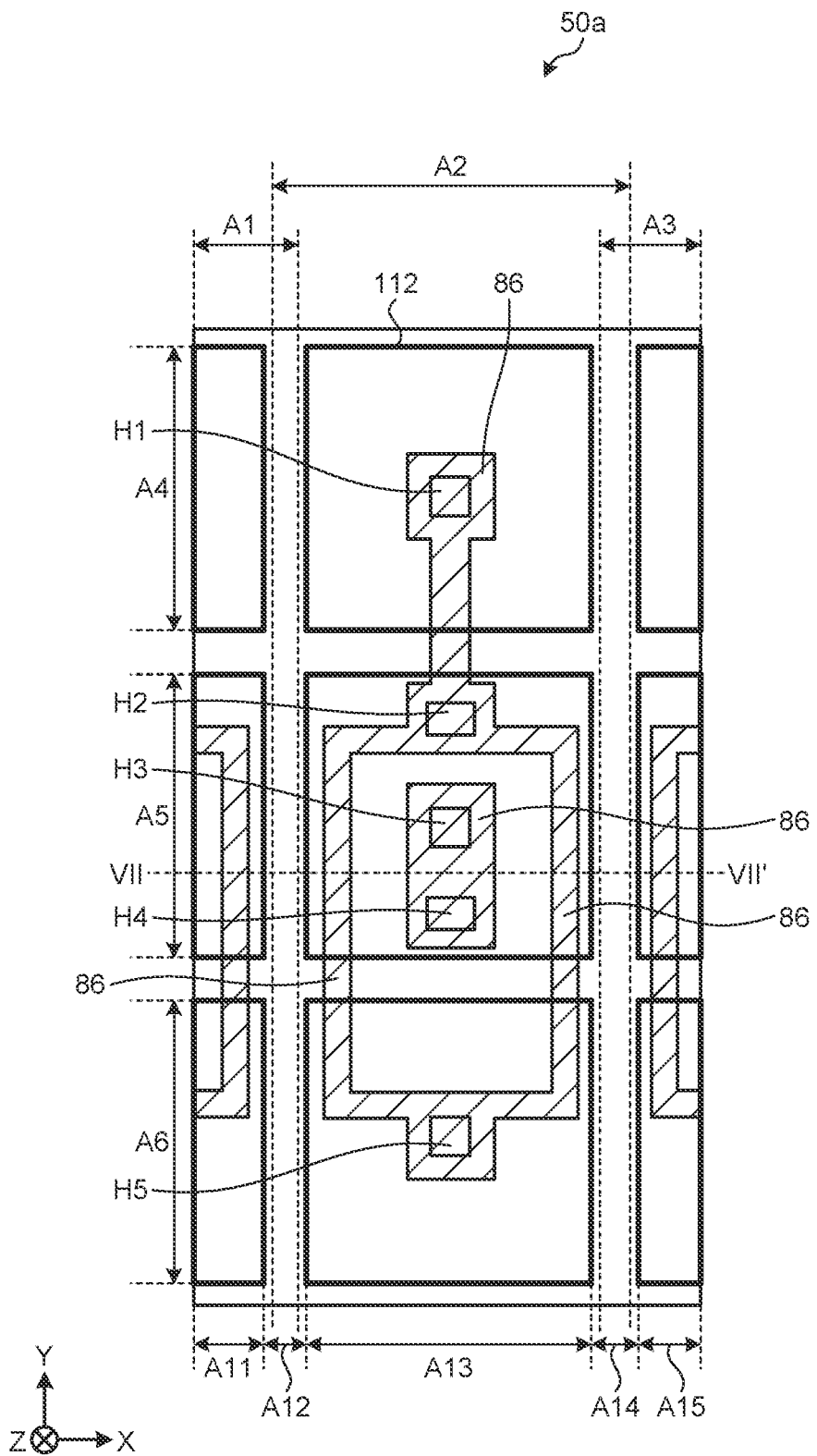
FIG. 6 is a plan view of the pixel according to a comparative example.
Figure 7:
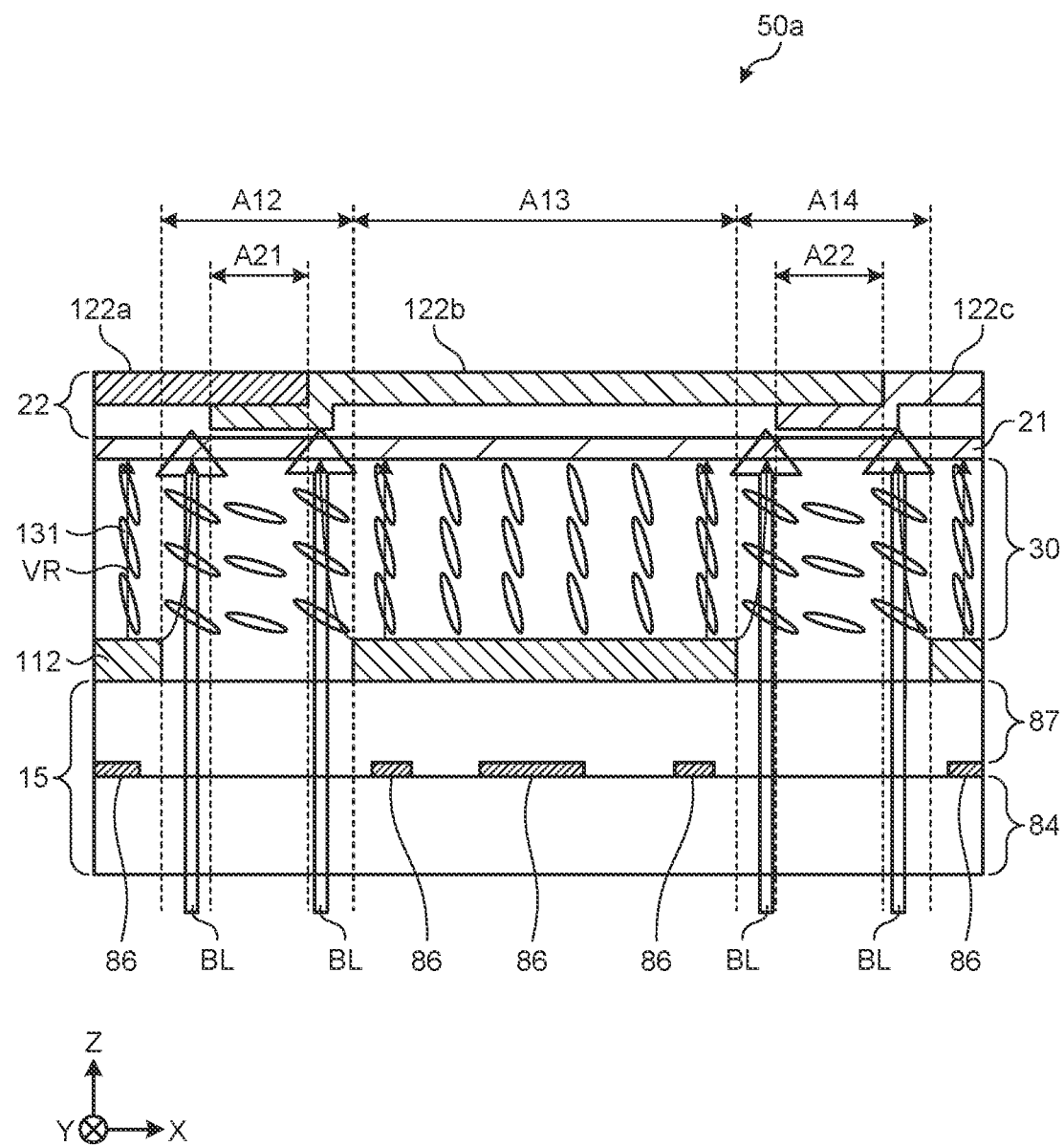
FIG. 7 is a sectional view along line VII-VII' of FIG. 6.

To facilitate the reader's understanding the first embodiment, the following describes a comparative example. FIG. 6 is a plan view of the pixel according to the comparative example. FIG. 7 is a sectional view along line VII-VII' of FIG. 6. In the comparative example, the same components as those according to the first embodiment are denoted by the same reference numerals, and explanation thereof may be omitted. FIG. 7 does not illustrate the configuration disposed on the color filter 22 on the observer's side in the Z-direction or the configuration disposed under the third insulating layer 84 on the backlight 40 side because they are the same as those according to the first embodiment. To simplify the explanation, FIG. 7 does not illustrate the orientation film AL1 described above or the orientation film formed on the surface of the common electrode 21 facing the liquid crystal.

In FIG. 6, the region A1 is a region covered with a color filter 122a, for example. The region A2 is a region covered with a color filter 122b, for example. The region A3 is a region covered with a color filter 122c, for example.

As illustrated in FIG. 7, the common electrode 21 and the reflective electrode layer 112 face each other with the liquid crystal layer 30 interposed therebetween in a pixel 50a according to the comparative example. The pixel 50a according to the comparative example has the transmissive display regions A12 and A14 and the reflective display region A13. Backlight light BL output from the backlight 40 (refer to FIG. 1) is incident on the transmissive display regions A12 and A14.

As illustrated in FIG. 7, the color filter 22 has an overlapping region A21 where the color filter 122b extends onto and overlaps the color filter 122a, for example. The color filter 22 has an overlapping region A22 where the color filter 122c extends onto and overlaps the color filter 122b, for example. The color filter 22 has an overlapping region where the color filter 122a extends onto and overlaps the color filter 122c, for example, which is not illustrated because it is similar to the overlapping regions described above.

Let us assume a case where one of adjacent sub-pixels is turned on, and the other is turned off in a bright external environment, for example. In this case, light from the reflective electrode is reflected at the end of the color filter 122b of the sub-pixel that is off, thereby causing the green component serving as the non-display color to mix with the red component serving as the display color. As a result, the national television system committee (NTSC) ratio may possibly deteriorate. To restrain color mixture in a bright external environment, the first embodiment has the regions where the color filters in different colors overlap each other, such as the overlapping regions A21 and A22.

The multilayered structure 15 includes the third insulating layer 84, the relay wiring 86, and the fourth insulating layer 87.

The relay wiring 86 is made of ITO or the like. As illustrated in FIGS. 7 and 6, the relay wiring 86 is not formed in the transmissive display region A12 or the transmissive display region A14.

The reflective electrode layer 112 is made of Ag (silver) or the like. As illustrated in FIG. 7, the reflective electrode layers 112 are formed on the multilayered structure 15. As illustrated in FIG. 6, the reflective electrode layers 112 are formed in the reflective display regions A11, A13, and A15.

As illustrated in FIG. 7, an electric field VR is applied between the common electrode 21 and the reflective electrode layer 112 in response to the operation of the pixel transistor 51 (refer to FIG. 2), and the orientation state of liquid crystal molecules 131 in the liquid crystal layer 30 changes. In the pixel 50a, no reflective electrode layer 112 is formed in the transmissive display region A12 or the transmissive display region A14. As a result, only a fringe electric field generated from the ends of the reflective electrode layers 112 is applied to the liquid crystal layer 30 in the transmissive display regions A12 and A14.

In a bright external environment, light reflected by the reflective electrode layers 112 is used for display. Therefore, the displayed image is controlled based on the electric field VR between the common electrode 21 and the reflective electrode layers 112. In an external environment where sufficient brightness is not secured, however, transmitted light leaking from the transmissive display regions A12 and A14 also contributes to display in an auxiliary manner. In the comparative example, the electric field intensity in the transmissive display regions A12 and A14 is significantly low, and the liquid crystal molecules 131 in the regions hardly move from their initial orientation state. As a result, the display auxiliary function of the transmissive display regions A12 and A14 may not be fully used.

Figure 8:
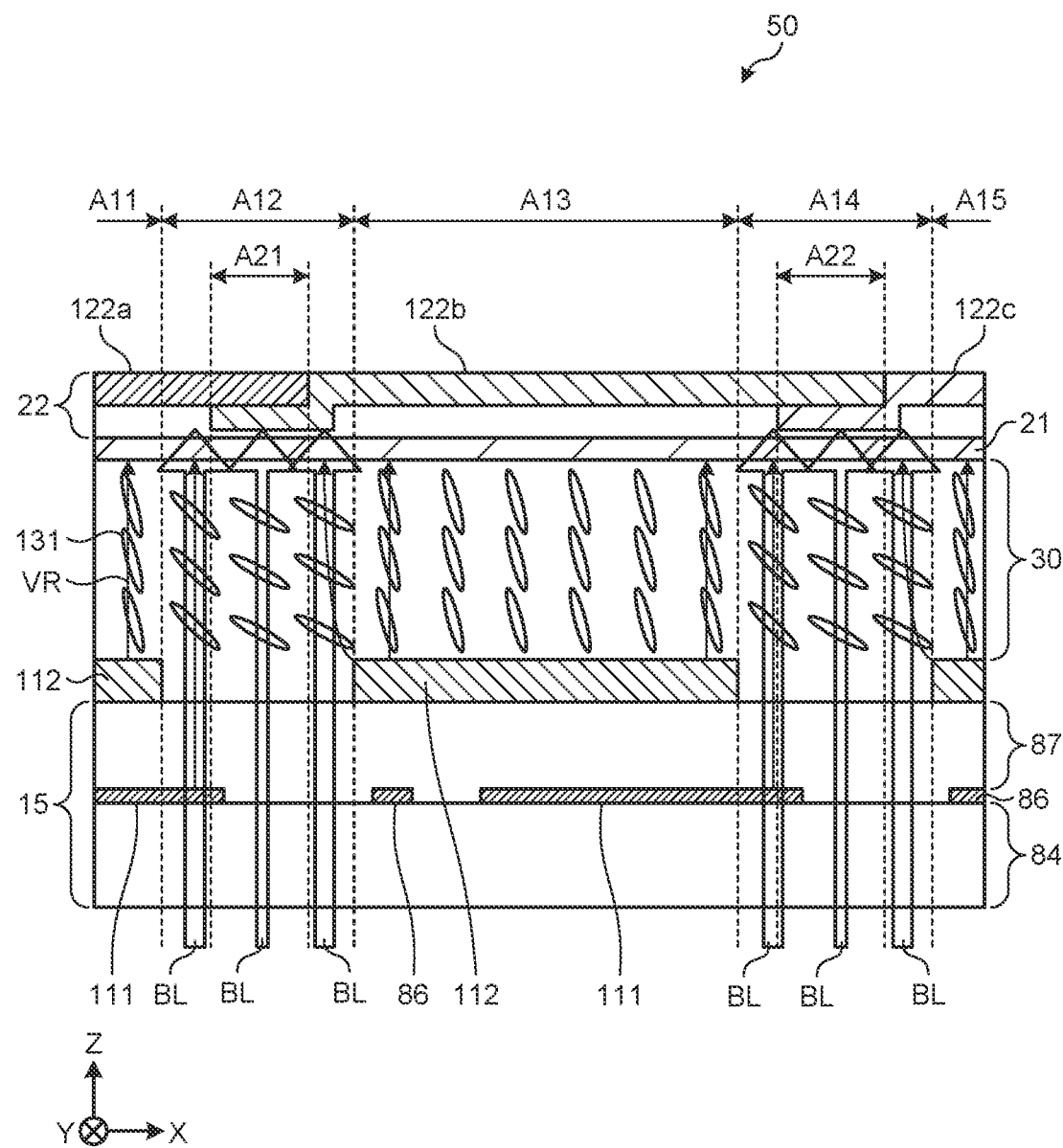
FIG. 8 is a sectional view along line VIII-VIII' of FIG. 3.

By contrast, the first embodiment increases the electric field intensity in the transmissive display regions A12 and A14. FIG. 8 is a sectional view along line VIII-VIII' of FIG. 3. The following describes the pixel 50 according to the first embodiment illustrated in FIG. 8 in comparison with the comparative example illustrated in FIG. 7. In a similar manner to FIG. 7, FIG. 8 does not illustrate the configuration disposed on the color filter 22 on the observer's side in the Z-direction or the configuration disposed under the third insulating layer 84 on the backlight 40 side. To simplify the explanation, FIG. 8 does not illustrate the orientation film AL1 described above or the orientation film formed on the surface of the common electrode 21 facing the liquid crystal.

Unlike the comparative example illustrated in FIG. 7, the pixel 50 according to the embodiment includes the light-transmitting conductive layer 111. As illustrated in FIG. 8, the light-transmitting conductive layer 111 overlapping the reflective electrode layer 112 in the reflective display region A11 protrudes to the transmissive display region A12 between the reflective electrode layers 112 adjacently disposed in the X-direction. The light-transmitting conductive layer 111 overlapping the reflective electrode layer 112 in the reflective display region A13 protrudes to the transmissive display region A14 between the reflective electrode layers 112 adjacently disposed in the X-direction. The light-transmitting conductive layer 111 overlapping the reflective electrode layer 112 in the reflective display region A15 protrudes to the transmissive display region between the reflective electrode layers 112 adjacently disposed in the X-direction, which is not illustrated because it is similar to the light-transmitting conductive layers described above.

With this configuration, the electric field VR is generated not only between the reflective electrode layer 112 and the common electrode 21 but also between the light-transmitting conductive layer 111 and the common electrode 21 in the transmissive display regions A12 and A14. Therefore, the orientation state of the liquid crystal molecules 131 in the liquid crystal layer 30 changes not only in the reflective display regions A11, A13, and A15 but also in the transmissive display regions A12 and A14. As a result, compared with the comparative example illustrated in FIG. 7, the pixel 50 according to the first embodiment improves the orientation characteristics of the liquid crystal molecules 131 in the transmissive display region A12 and A14, thereby enhancing the luminance of the entire pixel.

As illustrated in FIG. 8, the color filter 22 has the overlapping region A21 where the color filter 122b extends onto and overlaps the color filter 122a, for example. The color filter 22 has the overlapping region A22 where the color filter 122c extends onto and overlaps the color filter 122b, for example. The color filter 22 has an overlapping region where the color filter 122a extends onto and overlaps the color filter 122c, for example, which is not illustrated because it is similar to the overlapping regions described above.

The transmittance of the overlapping regions A21 and A22 is lower than the transmittance of the color filters 122a, 122b, and 122c. In other words, the overlapping regions A21 and A22 function as a light-shielding layer that hampers color mixture between the adjacent pixels. The light-transmitting conductive layer 111 overlapping the reflective electrode layer 112 in the reflective display region A11 is formed extending at least to the overlapping region A21. A part (end part) of the light-transmitting conductive layer 111 protruding between two reflective electrode layers 112 adjacently disposed in the X-direction overlaps the overlapping region A21 in plan view. With this configuration, the electric field VR generated by the light-transmitting conductive layer 111 can exert the maximum effect on the liquid crystal molecules 131 overlapping the color filter 122a in the transmissive display region A12. Needless to say, a black matrix may be provided instead of forming the light-shielding layer by stacking the color filters as described above.

Similarly, the light-transmitting conductive layer 111 overlapping the reflective electrode layer 112 in the reflective display region A13 is formed extending at least to the overlapping region A22. With this configuration, the electric field VR generated by the light-transmitting conductive layer 111 can exert the maximum effect on the liquid crystal molecules 131 overlapping the color filter 122b in the transmissive display region A14. As a result, in the pixel 50 according to the first embodiment, the liquid crystal molecules 131 in the transmissive display regions A12 and A14 contribute to the display quality in an external environment where sufficient brightness is not secured.

The light-transmitting conductive layer 111 overlaps only one of the two reflective electrode layers 112 adjacently disposed in the X-direction and does not overlap the other reflective electrode layer 112 (adjacent reflective electrode layer). With this configuration, the light-transmitting conductive layer 111 is less likely to overlap two of the color filters 122a, 122b, and 122c, thereby restraining color mixture in the transmissive display region A12 or A14.

Second Embodiment

Figure 9:
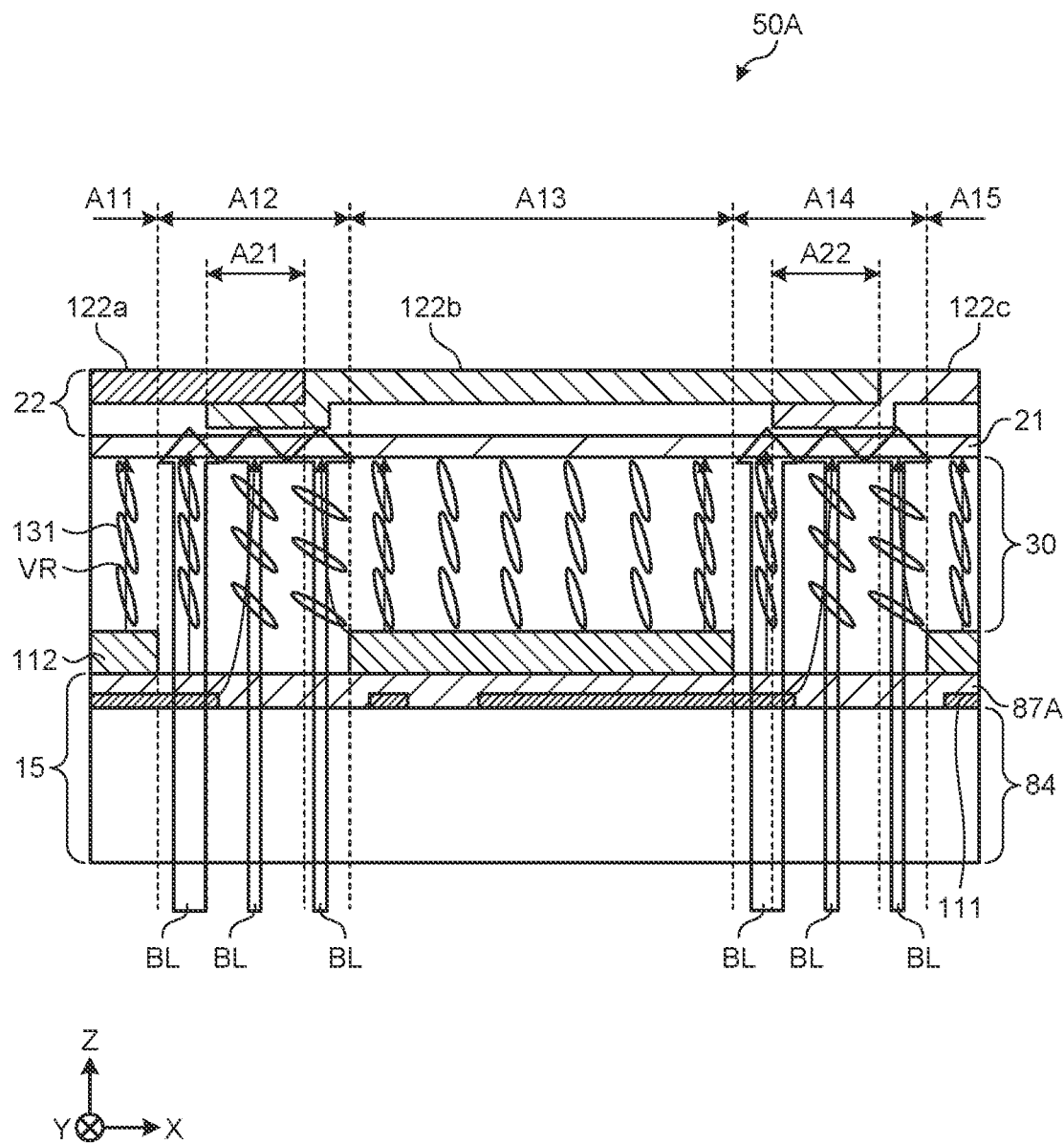
FIG. 9 is a sectional view of a partial section of the pixel according to a second embodiment.

FIG. 9 is a sectional view of a partial section of the pixel according to a second embodiment. A pixel 50A according to the second embodiment has the same configuration as that of the plane illustrated in FIG. 3. The section illustrated in FIG. 9 is the same part as the section along line VII-VII' of FIG. 6. In a similar manner to FIG. 8, FIG. 9 does not illustrate the configuration disposed on the color filter 22 on the observer's side in the Z-direction or the configuration disposed under the third insulating layer 84 on the backlight 40 side. To simplify the explanation, FIG. 9 does not illustrate the orientation film AL1 described above or the orientation film formed on the surface of the common electrode 21 facing the liquid crystal. In the second embodiment, the same components as those according to the first embodiment are denoted by the same reference numerals, and explanation thereof may be omitted.

In the pixel 50A according to the second embodiment illustrated in FIG. 9, a fourth insulating layer 87A is an inorganic film. The fourth insulating layer 87A is made of silicon nitride and can be made thinner than an organic film serving as the fourth insulating layer 87 according to the first embodiment.

While the fourth insulating layer 87 according to the first embodiment is formed with an organic film and is several micrometers in thickness, the fourth insulating layer 87A can be made thinner to approximately 200 nanometers. The thickness of the fourth insulating layer 87A is not limited to approximately 200 nanometers and may be other thicknesses. While the fourth insulating layer 87A is made of silicon nitride, for example, the material is not limited thereto. By using an inorganic film as the fourth insulating layer 87A between the light-transmitting conductive layer 111 and the reflective electrode layer 112, the distance between the light-transmitting conductive layer 111 and the common electrode 21 can be shortened.

With this configuration, the pixel 50A according to the second embodiment can have higher electric field intensity in the transmissive display regions A12 and A14 than the pixel 50 according to the first embodiment. Therefore, the second embodiment can further improve the transmission characteristics of the transmissive display regions A12 and A14.

Third Embodiment

Figure 10:
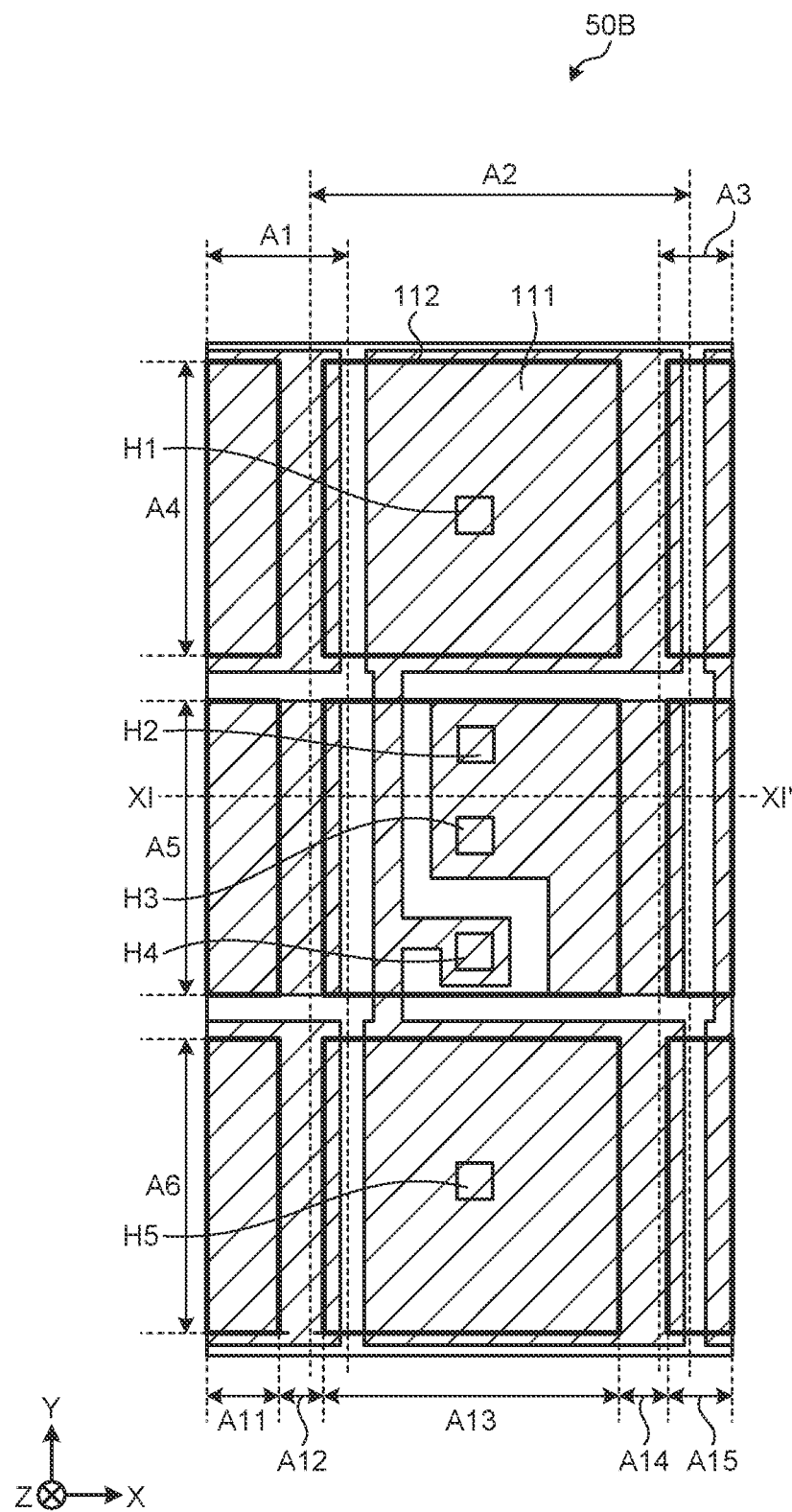
FIG. 10 is a plan view of the pixel according to a third embodiment.
Figure 11:
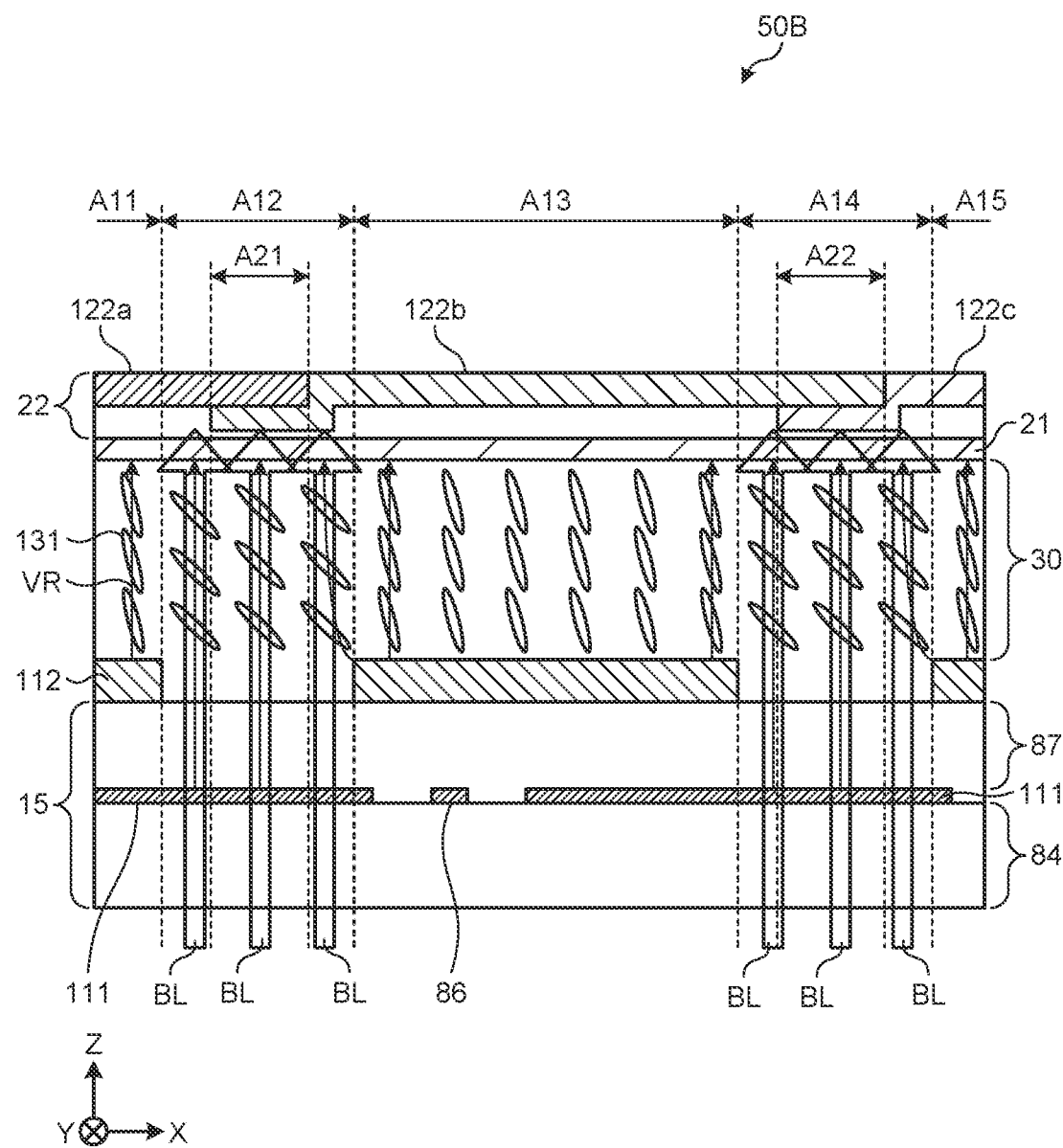
FIG. 11 is a sectional view along line XI-XI' of FIG. 10.

FIG. 10 is a plan view of the pixel according to a third embodiment. FIG. 11 is a sectional view along line XI-XI' of FIG. 10. In a similar manner to FIG. 8, FIG. 11 does not illustrate the configuration disposed on the color filter 22 on the observer's side in the Z-direction or the configuration disposed under the third insulating layer 84 on the backlight 40 side. To simplify the explanation, FIG. 11 does not illustrate the orientation film AL1 described above or the orientation film formed on the surface of the common electrode 21 facing the liquid crystal. In the third embodiment, the same components as those according to the first embodiment are denoted by the same reference numerals, and explanation thereof may be omitted.

In a pixel 50B according to the third embodiment illustrated in FIGS. 10 and 11, the light-transmitting conductive layer 111 protrudes longer than in the pixel 50 according to the first embodiment and overlaps both of two reflective electrode layers 112 adjacently disposed in the X-direction.

With this configuration, the area of the light-transmitting conductive layer 111 in the transmissive display region A12 or A14 increases. As a result, the pixel 50B according to the third embodiment can have higher electric field intensity in the transmissive display regions A12 and A14 than the pixel 50 according to the first embodiment.

To restrain color mixture, the overlapping region A21 may be provided onto the right end of the reflective electrode layer 112 in the reflective display region A13, and the overlapping region A22 may be provided onto the right end of the reflective electrode layer 112 in the reflective display region A15 in FIG. 11. In other words, color mixture can be restrained by forming the overlapping regions A21 and A22 according to the third embodiment at a position deviated from the center between the reflective electrode layers 112 adjacently disposed in the X-direction.

Modifications of the Third Embodiment

Figure 12:
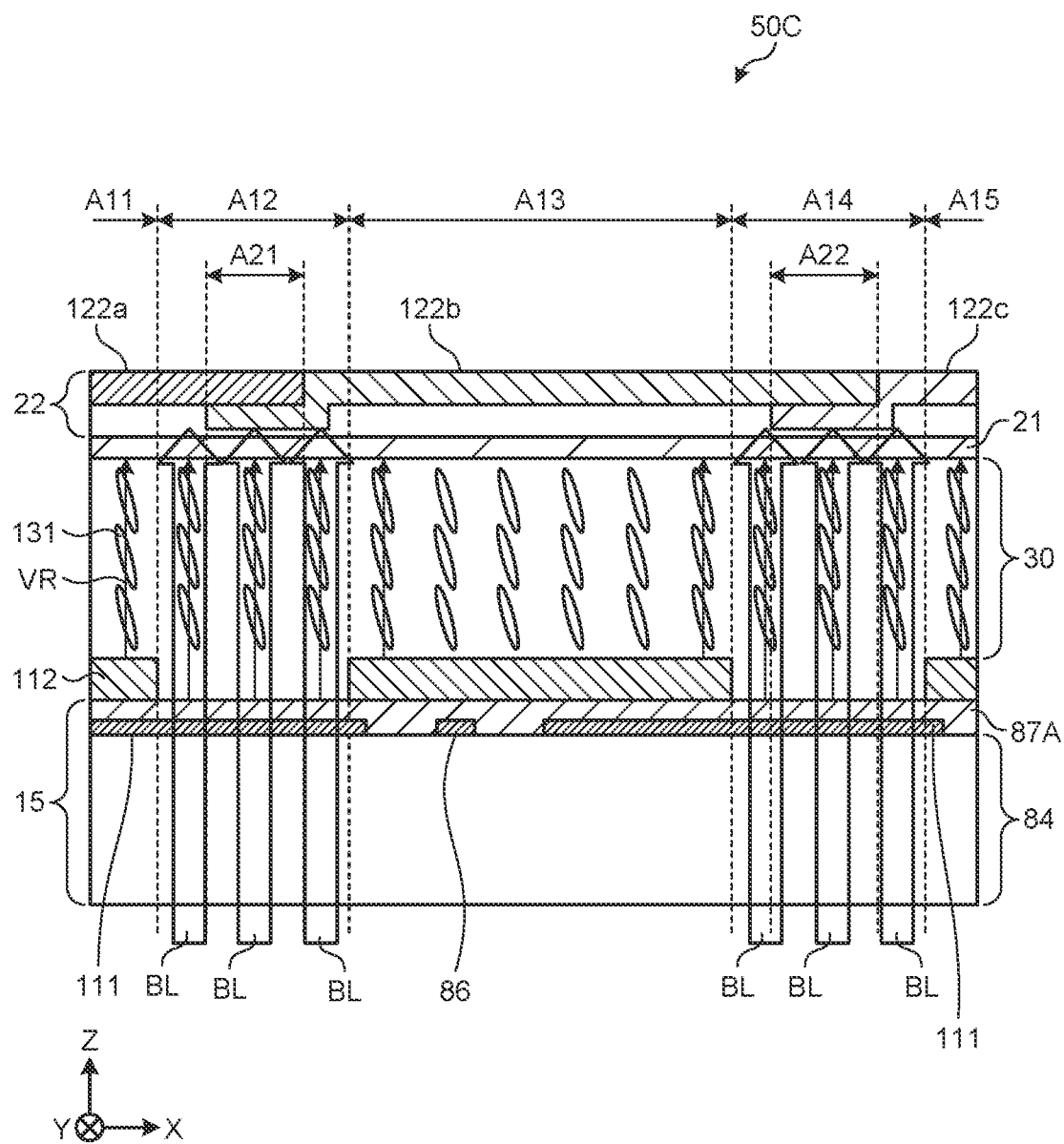
FIG. 12 is a sectional view of a modification of the third embodiment.

FIG. 12 is a sectional view of a modification of the third embodiment. The cross section illustrated in FIG. 12 is the same section as that along line XI-XI' of FIG. 10. In a similar manner to FIG. 8, FIG. 12 does not illustrate the configuration disposed on the color filter 22 on the observer's side in the Z-direction or the configuration disposed under the third insulating layer 84 on the backlight 40 side. To simplify the explanation, FIG. 12 does not illustrate the orientation film AL1 described above or the orientation film formed on the surface of the common electrode 21 facing the liquid crystal. In the modification of the third embodiment, the same components as those according to the first to the third embodiments are denoted by the same reference numerals, and explanation thereof may be omitted.

In a pixel 50C according to the modification of the third embodiment illustrated in FIG. 12, the fourth insulating layer 87A is an inorganic film. The fourth insulating layer 87A is made of silicon nitride and can be made thinner than an organic film serving as the fourth insulating layer 87 according to the third embodiment. In the pixel 50C according to the modification of the third embodiment, the light-transmitting conductive layer 111 protrudes longer than in the pixel 50 according to the first embodiment and overlaps both of the two reflective electrode layers 112 adjacently disposed in the X-direction.

With this configuration, the pixel 50C according to the modification of the third embodiment can have higher electric field intensity in the transmissive display regions A12 and A14 than the pixel 50B according to the third embodiment. Therefore, the modification of the third embodiment can further improve the transmission characteristics of the transmissive display regions A12 and A14.

Fourth Embodiment

Figure 13:
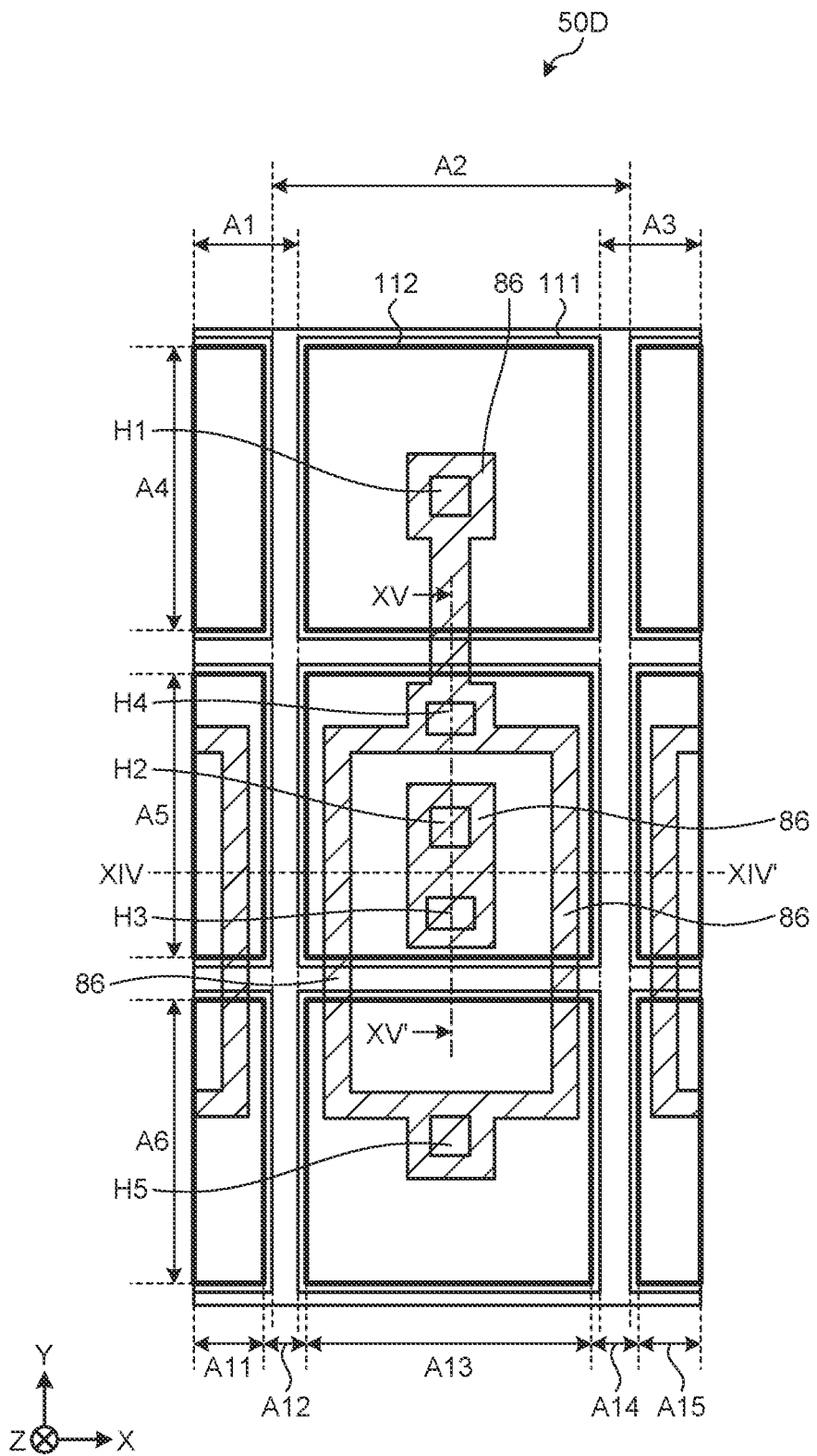
FIG. 13 is a plan view of the pixel according to a fourth embodiment.
Figure 14:
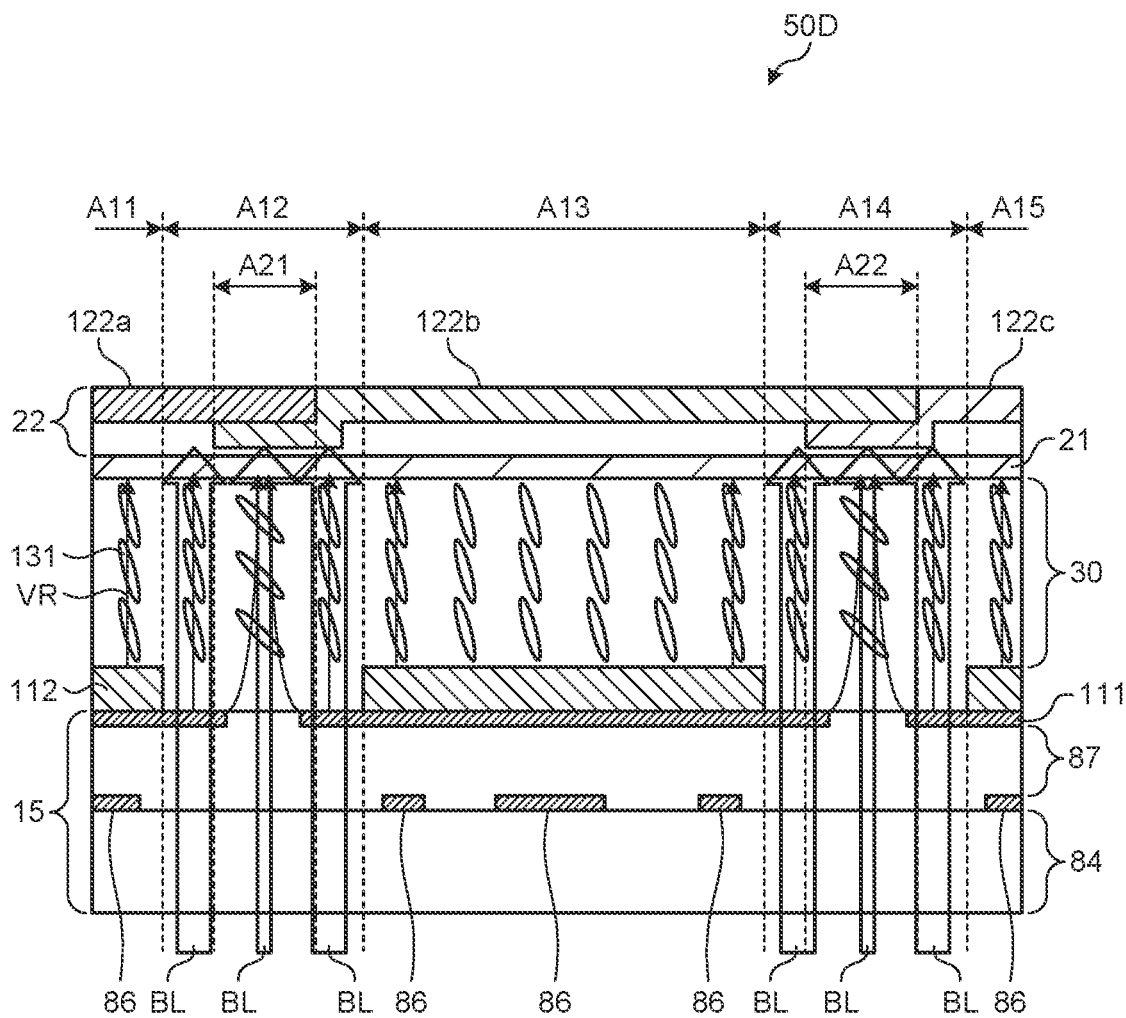
FIG. 14 is a sectional view along line XIV-XIV' of FIG. 13.
Figure 15:
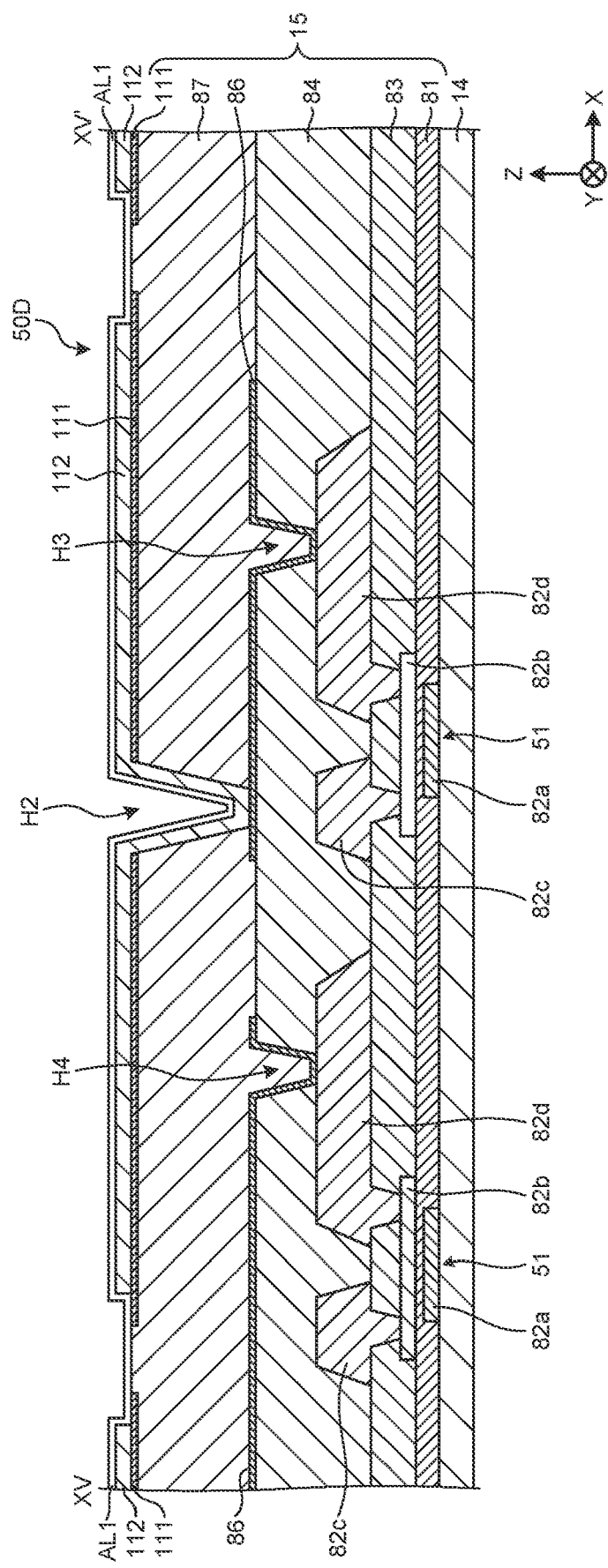
FIG. 15 is a sectional view along line XV-XV' of FIG.

FIG. 13 is a plan view of the pixel according to a fourth embodiment. FIG. 14 is a sectional view along line XIV-XIV' of FIG. 13. FIG. 15 is a sectional view along line XV-XV' of FIG. 13. In a similar manner to FIG. 8, FIG. 14 does not illustrate the configuration disposed on the color filter 22 on the observer's side in the Z-direction or the configuration disposed under the third insulating layer 84 on the backlight 40 side. To simplify the explanation, FIG. 14 does not illustrate the orientation film AL1 described above or the orientation film formed on the surface of the common electrode 21 facing the liquid crystal. In the fourth embodiment, the same components as those according to the comparative example and the first to the third embodiments are denoted by the same reference numerals, and explanation thereof may be omitted.

As illustrated in FIG. 15, the light-transmitting conductive layer 111 and the relay wiring 86 are formed in different layers in a pixel 50D according to the fourth embodiment. The reflective electrode layer 112 is formed directly on the light-transmitting conductive layer 111. With this configuration, the light-transmitting conductive layer 111 can protrude around the reflective electrode layer 112 independently of the path of the relay wiring 86.

The light-transmitting conductive layer 111 overlapping the reflective electrode layer 112 in the reflective display region A11 illustrated in FIG. 14, for example, protrudes to the transmissive display region A12 between the reflective electrode layers 112 adjacently disposed in the X-direction. By contrast, the light-transmitting conductive layer 111 overlapping the reflective electrode layer 112 in the reflective display region A13 illustrated in FIG. 14 protrudes to both of the transmissive display regions A12 and A14 between the reflective electrode layers 112 adjacently disposed in the X-direction. As a result, the overlapping area where the light-transmitting conductive layer 111 overlaps the color filter 122b is larger in the pixel 50D according to the fourth embodiment than in the pixel 50 according to the first embodiment.

With this configuration, the region A12 has not only the fringe electric field generated between the end of the reflective electrode layer 112 and the common electrode 21 but also the electric field VR generated between the common electrode 21 and the light-transmitting conductive layer 111. These electric fields change the orientation state of the liquid crystal molecules 131 in the liquid crystal layer 30 in the region A12. As a result, the pixel 50D according to the fourth embodiment has higher electric field intensity in the transmissive display regions A12 and A14 and has higher display quality in an external environment where sufficient brightness is not secured than the pixel 50 according to the first embodiment illustrated in FIG. 8 although the pixel 50D requires an extra process of forming the light-transmitting conductive layer 111 and the relay wiring 86 in different layers.

Fifth Embodiment

Figure 16:
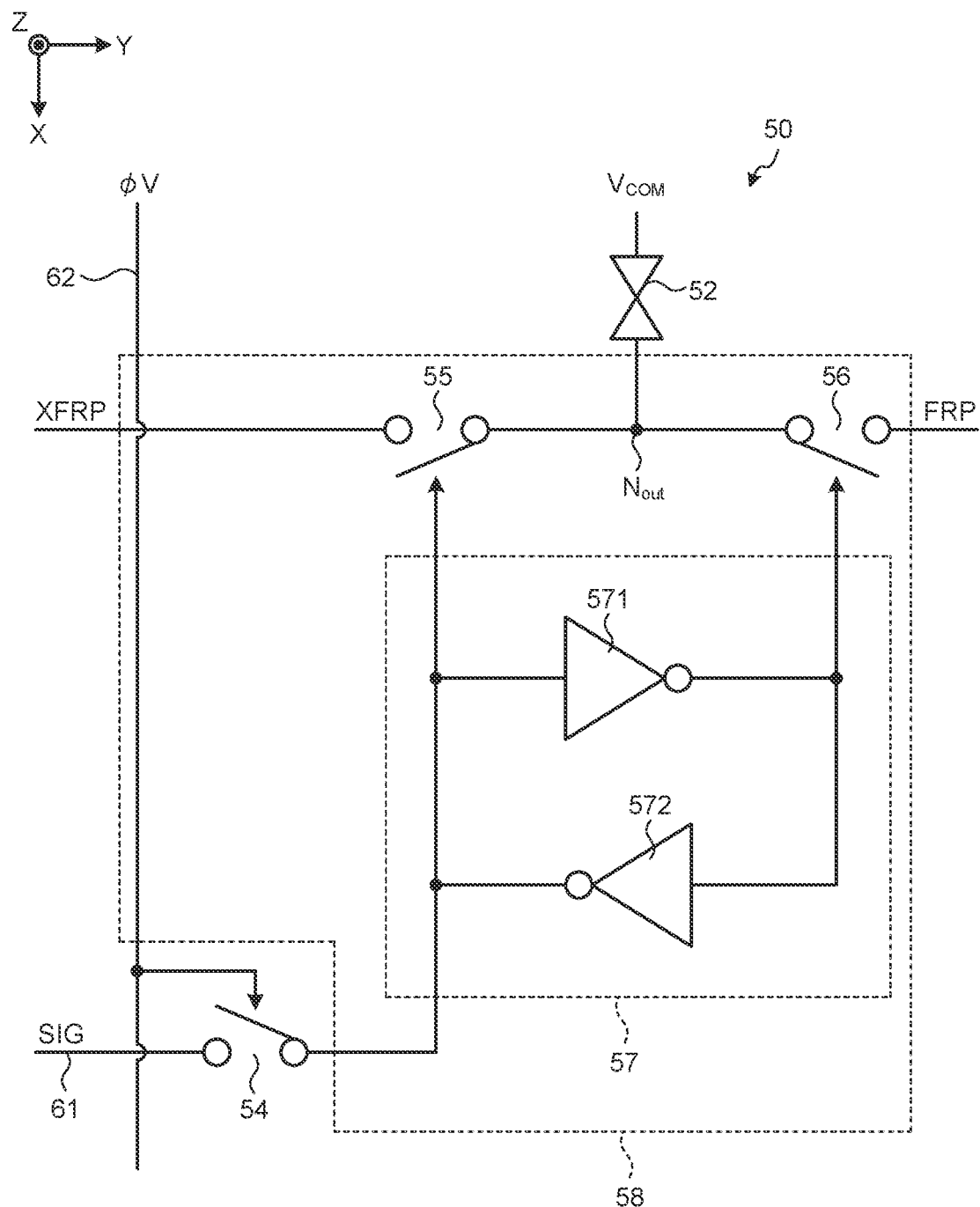
FIG. 16 is a circuit diagram of a circuit configuration example of the pixel with the MIP technology according to a fifth embodiment.
Figure 17:
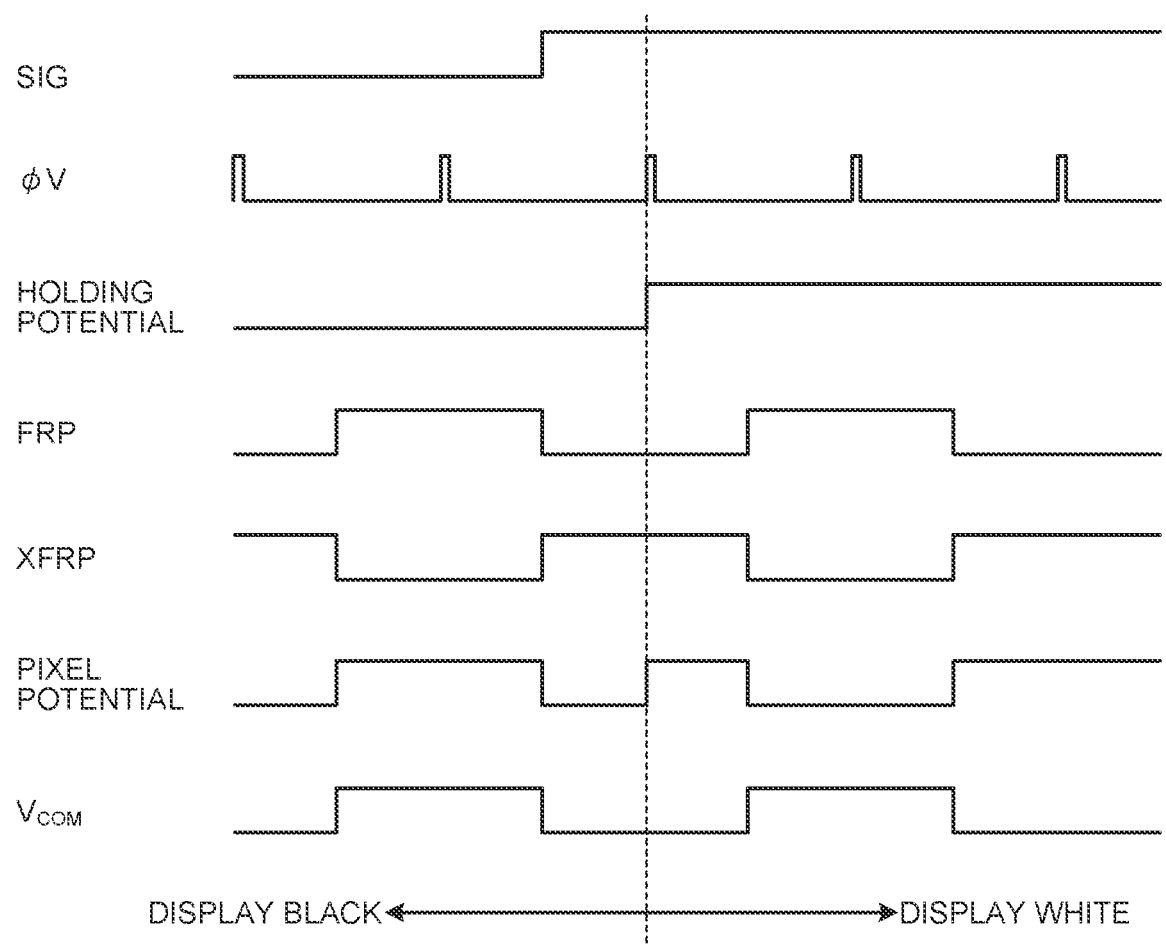
FIG. 17 is a timing chart for explaining an operation example of the pixel according to the fifth embodiment.

FIG. 16 is a circuit diagram of a circuit configuration example of the pixel with the MIP technology according to a fifth embodiment. FIG. 17 is a timing chart for explaining an operation example of the pixel according to the fifth embodiment. The pixel with the memory in pixel (MIP) technology can be used for the first to the fourth embodiments and the modifications thereof.

The pixel 50 according to the first embodiment to the pixel 50D according to the fourth embodiment can perform area coverage modulation display by coupling different reflective electrodes to the signal line 61 and the scanning line 62 via different drive circuits. In the embodiment described above, for example, the pixel 50 is divided into two kinds of display regions of the MSB region and the LSB region. By setting the area ratio of the MSB region to the LSB region in the display regions to 2:1, the pixel 50 can perform 2-bit area coverage modulation display with area ratios of 0, $1(2^0)$, $2(2^1)$, and $4(2^2)$. In the area coverage modulation display, the pixel is driven by what is called the MIP technology in which each pixel includes a memory capable of storing therein data instead of using the pixel transistor 51. This configuration facilitates digitally displaying the gradation of each pixel.

In the first embodiment, the pixel transistor 51 writes the electric potential of the signal line 61 as the electric potential of the reflective electrode layer 112. If the frame inversion driving method is employed, the pixel transistor 51 writes a signal voltage with the same polarity to the signal line 61 during one frame period, whereby shading may possibly occur. In a similar manner to the second embodiment, the light-transmitting conductive layer 111 overlapping the reflective electrode layer 112 in the reflective display region A15 according to the fifth embodiment protrudes to the transmissive display region between the reflective electrode layers 112 adjacently disposed in the X-direction. With this configuration, interlayer capacitance is generated between the reflective electrode layer 112 and the light-transmitting conductive layer 111. If the fourth insulating layer 87A (refer to FIG. 9) is used like the second embodiment, the interlayer capacitance increases. As a result, the display quality may possibly deteriorate due to fluctuations in electric potential caused by capacitance coupling via the interlayer capacitance depending on the display image.

By contrast, each pixel 50 with the MIP technology according to the fifth embodiment has a memory function. In the MIP technology, a constant voltage is always applied to the pixel, thereby reducing shading. In addition, the fifth embodiment can reduce the effect of the interlayer capacitance generated between the reflective electrode layer 112 and the light-transmitting conductive layer 111 because the pixel is driven by direct current.

The MIP technology can implement a memory display mode by the pixel including a memory that stores therein data. The memory display mode is a display mode for digitally displaying the gradation of the pixel based on binary information (logical "1"/logical "0") stored in the memory of the pixel.

As illustrated in FIG. 16, the pixel 50 includes the liquid crystal capacitor 52 and a pixel circuit 58. The pixel circuit 58 includes a switching element 55, a switching element 56, and a latch 57. The pixel circuit 58 has a static random access memory (SRAM) function. In other words, the pixel 50 has a configuration with the SRAM function.

A switching element 54 corresponds to the pixel transistor 51 described in the first embodiment. In the MIP technology according to the fifth embodiment, the pixel circuit 58 is interposed between the reflective electrode (the light-transmitting conductive layer 111 and the reflective electrode layer 112) and the pixel transistor 51 serving as the switching element 54. One end of the switching element 54 is electrically coupled to the signal line 61 (corresponding to the signal lines $61_1$ to $61_3$ in FIG. 2). The switching element 54 receives a scanning signal φV from the scanning circuit 71 illustrated in FIG. 2 via the scanning line 62, for example. The switching element 54 is turned on when it receives the scanning signal φV. When the switching element 54 is turned on, for example, it acquires data SIG from the signal output circuit 70 illustrated in FIG. 2 via the signal line 61.

The latch 57 includes an inverter 571 and an inverter 572. The input terminal of the inverter 571 and the output terminal of the inverter 572 are electrically coupled. The output terminal of the inverter 571 and the input terminal of the inverter 572 are electrically coupled. In other words, the inverter 571 and the inverter 572 are coupled in parallel in opposite directions. The latch 57 has a function to hold the electric potential corresponding to the data SIG acquired by the switching element 54.

A first terminal of the switching element 55 receives a control pulse (first display signal) XFRP having a phase opposite to that of the common potential VCOM. A second terminal of the switching element 55 is electrically coupled to an output node Nout of the pixel circuit.

A first terminal of the switching element 56 receives a control pulse (second display signal) FRP having the same phase as that of the common potential VCOM. A second terminal of the switching element 56 is electrically coupled to the output node Nout. In other words, the second terminals of the switching elements 55 and 56 are electrically coupled to the common output node Nout.

Either the switching element 55 or the switching element 56 is turned on based on the polarity of the electric potential held by the latch 57. When the switching element 55 is turned on, the control pulse XFPR is applied to the liquid crystal capacitor 52. When the switching element 56 is turned on, the control pulse (second display signal) FRP is applied to the liquid crystal capacitor 52. More specifically, the output node Nout is coupled to reflective electrode layer 112 (pixel electrode) and the light-transmitting conductive layer 111 via the relay wiring 86. As a result, either one of the control pulses applied to the output node Nout is applied to the reflective electrode layer 112 and the light-transmitting conductive layer 111 facing each other with the common electrode and the liquid crystal layer interposed therebetween.

FIG. 17 illustrates the operations of the data SIG, the scanning signal φV, the holding potential held by the latch 57, the control pulse (second display signal) FRP, the control pulse (first display signal) XFRP, the pixel potential, and the common potential VCOM.

The display modes include a normally white mode and a normally black mode. The normally white mode is a mode for displaying white when no electric field (voltage) is applied and displaying black when an electric field is applied. The normally black mode is a mode for displaying black when no electric field is applied and displaying white when an electric field is applied. The display device according to the present embodiment can employ both the normally white mode and the normally black mode. If the normally black mode is employed, the display device displays black when no voltage is applied to the liquid crystal, that is, when the liquid crystal orientation is uniform and can make the black color clear. Therefore, the display device can enhance the contrast. In the normally black mode illustrated in FIG. 17, when the holding potential of the latch 57 has negative polarity, the pixel potential of the liquid crystal capacitor 52 is in phase with the common potential VCOM. As a result, the display device displays black. When the holding potential of the latch 57 has positive polarity, the pixel potential of the liquid crystal capacitor 52 is in opposite phase to the common potential VCOM. As a result, the display device displays white.

In the pixel 50 with the MIP technology, either the switching element 55 or the switching element 56 is turned on based on the polarity of the holding potential of the latch 57. Therefore, the control pulse (second display signal) FRP or the control pulse (first display signal) XFRP is applied to the pixel electrode of the liquid crystal capacitor 52. As a result, a constant voltage is always applied to the pixel 50, thereby reducing shading.

While the SRAM is used as the memory incorporated in the pixel 50 in the example illustrated in FIG. 16, the present disclosure is not limited thereto. The memory incorporated in the pixel 50 is not limited to the SRAM and may be a dynamic random access memory (DRAM), for example. The pixel 50 may incorporate other memories.

While the pixel with the MIP technology in which each pixel includes a memory capable of storing therein data is used as the pixel with a memory function in the example described above, this is given by way of example only. Instead of the pixel with the MIP technology, pixels with known memory liquid crystals, for example, may be used as the pixel with a memory function.

Modifications of the Pixel

Figure 18:
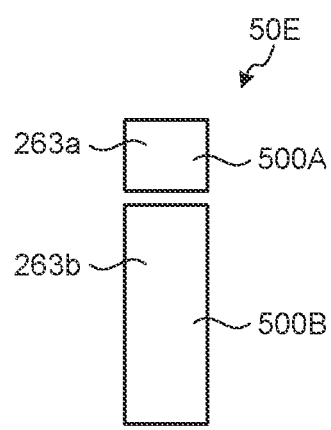
FIG. 18 is a plan view for explaining a first modification of the pixel configuration according to the embodiments.

The following describes a first modification of the pixel configuration according to the embodiments with reference to FIG. 18. FIG. 18 is a plan view for explaining the first modification of the pixel configuration according to the embodiments.

As illustrated in FIG. 18, a pixel 50E includes a sub-pixel 500A and a sub-pixel 500B. The sub-pixel 500A and the sub-pixel 500B are disposed in parallel. The sub-pixel 500A includes a reflective electrode 263a. The sub-pixel 500B includes a reflective electrode 263b. The area ratio of the reflective electrode 263a to the reflective electrode 263b is 1:2. The reflective electrode 263a and the reflective electrode 263b are electrically coupled to the signal line 61 and the scanning line 62 via different drive circuits. With this configuration, the embodiments can perform area coverage modulation display using the pixel 50E.

Figure 19:
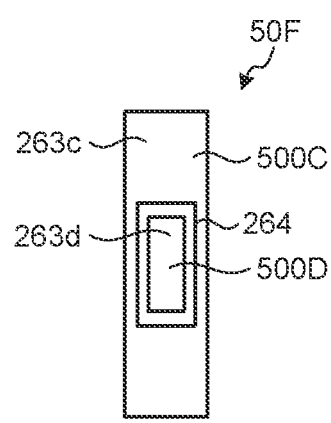
FIG. 19 is a plan view for explaining a second modification of the pixel configuration according to the embodiments.

The following describes a second modification of the pixel configuration according to the embodiments with reference to FIG. 19. FIG. 19 is a plan view for explaining the second modification of the pixel configuration according to the embodiments.

As illustrated in FIG. 19, a pixel 50F includes a sub-pixel 500C and a sub-pixel 500D. The sub-pixel 500C includes a reflective electrode 263c. The sub-pixel 500D includes a reflective electrode 263d. The reflective electrode 263c has an opening 264. The sub-pixel 500D is disposed in the opening 264. The reflective electrode 263c and the reflective electrode 263d are electrically coupled to the signal line 61 and the scanning line 62 via different drive circuits. With this configuration, the embodiments can perform area coverage modulation display using the pixel 50F.

While the pixel 50 is divided into two sub-pixels in the first and the second modifications of the pixel configuration, the present disclosure is not limited thereto. The pixel 50 may be divided into three or more sub-pixels.

While exemplary embodiments according to the present disclosure have been described, the contents of the embodiments are not intended to limit the present disclosure. The components described above include components easily conceivable by those skilled in the art, components substantially identical therewith, and components within what is called the range of equivalence. The components described above may be appropriately combined. Furthermore, various omissions, substitutions, and modifications of the components may be made without departing from the gist of the embodiments described above.

One pixel, for example, is not limited to the combination of the sub-pixels in the three primary colors of RGB. A unit pixel may be obtained by adding one or more colors to the three primary colors of RGB, for example. More specifically, for example, a unit pixel may be obtained by adding a sub-pixel that displays white (W) to enhance the luminance or by adding at least one sub-pixel that displays a complementary color to expand the color extension range.

What is claimed is:

1. A display device comprising:
    an array substrate comprising reflective electrodes arrayed in a matrix having a row-column configuration in a first direction and a second direction and a light-transmitting conductive layer at least partially overlapping any one of the reflective electrodes when viewed in a third direction orthogonal to the first direction and the second direction;
    a counter substrate comprising a common electrode overlapping the reflective electrodes when viewed in the third direction and a color filter including a plurality of colors;
    an insulating layer;
    an orientation film; and a backlight, wherein
the light-transmitting conductive layer is disposed between the array substrate and the reflective electrodes,
the array substrate is disposed between the counter substrate and the backlight,
the light-transmitting conductive layer is connected to at least one of the reflective electrodes through a contact hole,
a main surface of the light-transmitting conductive layer is not in physical contact with a main surface of the at least one of the reflective electrodes,
the main surface of the light-transmitting conductive layer and the main surface of the at least one of the reflective electrodes are in physical contact with the insulating layer,
the light-transmitting conductive layer is connected to a thin film transistor through a second contact hole that does not overlap the first contact hole in a plan view,
the orientation film is in physical contact with the at least one of the reflective electrodes and is not in physical contact with the light-transmitting conductive layer,
part of the orientation film is disposed in the first contact hole,
the light-transmitting conductive layer overlaps a first reflective electrode, a second reflective electrode, and a third reflective electrode which are included in the reflective electrodes, are adjacent to one another, and arrayed in the first direction in an order as listed,
the light-transmitting conductive layer overlaps a whole of the first reflective electrode and a whole of the third electrode,
the second reflective electrode has a first portion which overlaps the light-transmitting conductive layer and a second portion which does not overlaps the light-transmitting conductive layer,
the light-transmitting conductive layer has a first line shaped portion and a second line shaped portion,
the first line shaped portion extends in the first direction and overlaps the first portion, and
the second line shaped portion protrudes from the first line shaped portion in a direction different from the first direction, and is connected to the thin film transistor through the second contact hole.

2. The display device according to claim 1, wherein
the color filter comprises a first color filter in a first color extending in the second direction and a second color filter in a second color different from the first color disposed adjacently to the first color filter in the first direction and extending in the second direction,
the color filter has an overlapping region where the first color filter and the second color filter overlap each other, and
the part of the light-transmitting conductive layer protruding between the two reflective electrodes adjacently disposed in the first direction overlaps the overlapping region when viewed in the third direction.

3. The display device according to claim 1, wherein the light-transmitting conductive layer extends from one reflective electrode to the other reflective electrode of the two reflective electrodes adjacently disposed in the first direction and overlaps both of the two reflective electrodes.

4. The display device according to claim 1, wherein
the insulating layer is interposed between the reflective electrodes and the light-transmitting conductive layer, and
the insulating layer is an inorganic film.

5. The display device according to claim 1, wherein
more than one of the reflective electrodes constitute a pixel,
the first line shaped portion and the second line shaped portion are relay wiring that couples at least two reflective electrodes of the reflective electrodes, and
the light-transmitting conductive layer is provided in the same layer as a layer of the relay wiring.

* * * * *